US012620337B2

(12) United States Patent
Jiang et al.

(10) Patent No.: US 12,620,337 B2
(45) Date of Patent: May 5, 2026

(54) DRIVING METHOD, DRIVING DEVICE, DISPLAY DEVICE AND ELECTRONIC DEVICE

(71) Applicant: HKC CORPORATION LIMITED, Shenzhen (CN)

(72) Inventors: Yongjie Jiang, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/668,342

(22) Filed: May 20, 2024

(65) Prior Publication Data

US 2025/0014496 A1 Jan. 9, 2025

(30) Foreign Application Priority Data

Jul. 5, 2023 (CN) ........................ 202310814548.9

(51) Int. Cl.
*G09G 3/20* (2006.01)

(52) U.S. Cl.
CPC .......... *G09G 3/207* (2013.01); *G09G 3/2092* (2013.01); *G09G 2300/0452* (2013.01); *G09G 2320/0209* (2013.01); *G09G 2320/0233* (2013.01); *G09G 2320/0242* (2013.01); *G09G 2320/0686* (2013.01); *G09G 2320/0693* (2013.01)

(58) Field of Classification Search
CPC .... G09G 3/3225; G09G 3/3648; G09G 3/207; G09G 3/006; G09G 2320/0686; G09G 2320/0233; G09G 2320/0242; G09G 2320/0693; G09G 2320/0209; G09G 3/2092
See application file for complete search history.

(56) References Cited

U.S. PATENT DOCUMENTS

| | | | | |
|---|---|---|---|---|
| 2015/0348489 A1* | 12/2015 | Kabe | G09G 3/3696 | |
| | | | 345/94 | |
| 2015/0356932 A1 | 12/2015 | Kim et al. | | |
| 2019/0114993 A1* | 4/2019 | Yang | G09G 5/10 | |
| 2020/0365090 A1 | 11/2020 | Yoon et al. | | |

FOREIGN PATENT DOCUMENTS

| | | |
|---|---|---|
| CN | 107659779 | 2/2018 |
| CN | 110782851 | 2/2020 |
| CN | 113270076 | 8/2021 |
| CN | 114815420 | 7/2022 |
| CN | 114937430 | 8/2022 |
| CN | 115775516 | 3/2023 |

OTHER PUBLICATIONS

CNIPA, First Office Action for CN Application No. 202310814548.9, Aug. 6, 2023.

* cited by examiner

*Primary Examiner* — Xuemei Zheng
(74) *Attorney, Agent, or Firm* — Hodgson Russ LLP

(57) ABSTRACT

A driving method is provided. In the driving method, when there is the color crosstalk in the display screen, the target region and the to-be-calibrated region are first determined based on the gray scale value of each region of the to-be-displayed screen, so that by comparing the absolute value of the gray scale difference between the color pixel in the to-be-calibrated region and the target color pixel in the target region on the same data line with the preset threshold, whether the gray scale difference between the to-be-calibrated region and the target region affects the image quality can be determined.

20 Claims, 10 Drawing Sheets

DRIVING METHOD, DRIVING DEVICE, DISPLAY DEVICE AND ELECTRONIC DEVICE

CROSS-REFERENCE TO RELATED APPLICATIONS

The present disclosure claims priority to Chinese Patent Application No. 202310814548.9, filed Jul. 5, 2023, the entire disclosure of which is incorporated herein by reference.

TECHNICAL FIELD

The present disclosure relates to the field of driving display technology, particularly, to a driving method, a driving device, a display device and an electronic device.

BACKGROUND

With the development of liquid crystal display (LCD) technology, the requirements for thin-film transistor liquid crystal displays in terms of high resolution, wide viewing angle, high response speed, high opening rate and so on are getting higher and higher, and along with the shrinking of the size of the pixel, the line spacing on the Thin Film Transistor (TFT) substrate is getting smaller and smaller, and the coupling between different signal lines is aggravated, so that when a signal jumps, it may affect the stability of other signals in the periphery thereof. Therefore, the color crosstalk has been a common phenomenon in display defects of the LCD, which specifically refers to a screen of a certain region will affect the screen of other regions, resulting in a poor display phenomenon. According to the occurrence of crosstalk in different locations, the crosstalk can be divided into a vertical crosstalk and a horizontal crosstalk. The crosstalk phenomenon is caused by the capacitance coupling effect between the data line and the common electrode. For example, when the potential of the data line changes, the parasitic capacitance between the data line and the common electrode forms an instantaneous potential jump in the common electrode line. At this time, if the signal of the common electrode delays more seriously or the driving ability of the voltage is insufficient, its' potential can not be quickly restored to the preset potential, and the jump of this potential will pull down the trans-voltage in the pixel through the coupling effect of the storage capacitance, resulting in a reduction of the luminance of the pixel, thereby forming the crosstalk.

SUMMARY

There are provided a driving method, a driving device, a display device, and an electronic device according to the embodiments of the present disclosure. The technical solution is as below:

A first aspect of the embodiments of the present disclosure provides a driving method, which includes:

- detecting a data signal of a to-be-displayed screen to obtain a gray scale value of each region in the to-be-displayed screen;
- determining whether there is a color crosstalk in the to-be-displayed screen based on the gray scale value of each region;
- determining a target region and a to-be-calibrated region based on the gray scale value, when there is the color crosstalk in the to-be-displayed screen, wherein a gray scale value of target color pixel in the target region is greater than 0, and gray scale values of color pixels in the target region other than the target color pixel are all equal to 0, and the target color pixel is a red pixel, a blue pixel or a green pixel, the to-be-calibrated region is a region adjacent to the target region on a data line, and a gray scale value of each color pixel in the to-be-calibrated region is the same;
- obtaining an absolute value of a gray scale difference between the color pixel in the to-be-calibrated region and the target color pixel in the target region on the same data line;
- determining whether the absolute value of the gray scale difference is greater than a preset threshold;
- determining target compensation data from a pre-obtained compensation data set based on the absolute value of the gray scale difference, when the absolute value of the gray scale difference is greater than the preset threshold; and
- sending the target compensation data to a driver for the driver compensating for display data of the to-be-calibrated region based on the target compensation data, to drive the to-be-displayed screen to display.

A second aspect of the embodiment of the present disclosure provides a driving device, including a logic board and a driver, where the driver is electrically connected to the logic board;

- the logic board is configured for executing the driving method according to any one of embodiments of the present disclosure; and
- the driver is configured for receiving the target compensation data, and compensating for the display data of the to-be-calibrated region based on the target compensation data, to drive the to-be-displayed screen to display.

A third aspect of the embodiment of the present disclosure provides a display device, including a display panel and the driving device as recited in the second aspect of the embodiment of the present disclosure;

- the driver is configured for compensating for the display data of the to-be-calibrated region based on the target compensation data, to drive the to-be-displayed screen to display on the display panel.

A fourth aspect of the embodiment of the present disclosure provides an electronic device, including a memory and a processor, where the memory stores a computer program, and the processor implements the method according to any one of the embodiments of the present disclosure when executing the computer program.

Other features and advantages of the present disclosure will become apparent through the following detailed description, or will be obtained in part through the practice of the present disclosure.

It should be understood that the above general description and the detailed description that follows are merely exemplary and do not limit the present disclosure.

BRIEF DESCRIPTION OF THE DRAWINGS

The foregoing and other objects, features and advantages of the present disclosure will become more apparent by describing in detail the exemplary embodiments thereof with reference to the accompanying drawings.

DETAILED DESCRIPTION OF THE EMBODIMENTS

In order to make the purpose, technical solutions and advantages of the present disclosure clearer and more understandable, the present disclosure is described in further detail hereinafter in conjunction with the accompanying drawings and embodiments. It should be understood that the specific embodiments described herein are only for explaining the present disclosure and are not intended to limit the present disclosure.

It should be noted that although a division of functional modules is made in the schematic diagram of the device, and a logical order is shown in the flowchart, in some cases, the steps shown or described may be performed in an order different from the division of modules in the device, or the order in the flowchart. The terms "first", "second", etc. in the specification and the claims and in the accompanying drawings described above are used to distinguish similar objects and need not be used to describe a particular order or sequence.

Unless otherwise defined, all technical and scientific terms used herein have the same meaning as commonly understood by those skilled in the art of this application. The terms used herein are for the purpose of describing embodiments of the present disclosure only and are not intended to limit the present disclosure.

With the development of display technology, planar display devices such as liquid crystal displays (LCDs) are widely used in various consumer electronic products such as mobile phones, televisions, personal digital assistants, digital cameras, notebook computers, desktop computers, and other consumer electronic products due to their advantages such as high image quality, power saving, thin bodies, and a wide range of applications, and they have become the mainstream in display devices.

Most of the existing liquid crystal displays on the market are the backlight type of the liquid crystal display, including a liquid crystal display panel and a backlight module. The working principle of the LCD panel is that the liquid crystal molecules are injected between the thin film transistor (TFT) array substrate and the color filter (CF) substrate, and a driving voltage is applied to the two substrates to control the rotational direction of the liquid crystal molecules to refract the light from the backlight module to produce a image.

Figure 1:
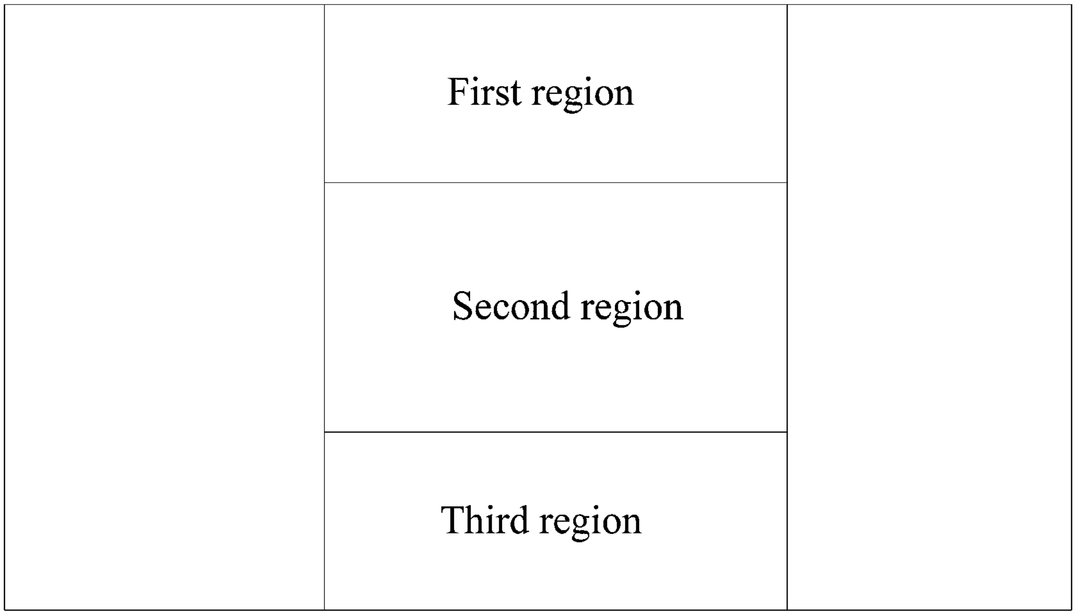
FIG. 1 is a schematic diagram for common detection of color crosstalk.

The color crosstalk is an image quality problem often encountered in the industry. As shown in FIG. 1, FIG. 1 is a common schematic diagram for showing a detection of color crosstalk. The second region in FIG. 1 is the pure green screen, the gray scale value of other screens other than the second region is G127. But the upper region (i.e., the first region) of the second region and the lower region (i.e., the third region) of the second region will be affected by the second region, so that the gray scale of the first region is changed from the G127 into a light green, the gray scale of the third region is changed from the G127 into a light violet.

Figure 2:
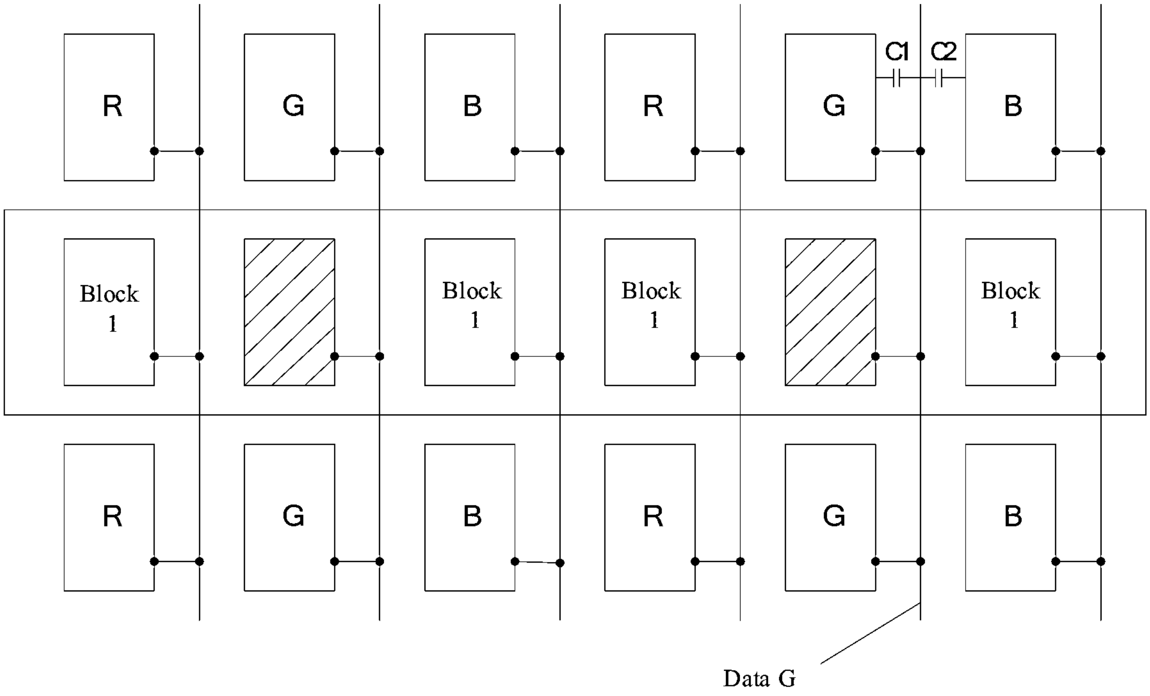
FIG. 2 is a schematic diagram showing causes of color crosstalk.

The color crosstalk is caused due to the presence of coupling capacitance on the data lines, with reference to FIG. 2, which is a schematic diagram for showing the cause of color crosstalk. There is a parasitic capacitor C1 (i.e., Cpd1) between the green data line (Data G) and the green pixel, and a parasitic capacitor C2 (i.e., Cpd2) between the green data line (Data G) and the blue pixel. When the green data line (Data G) suddenly changes, the parasitic capacitors C1 and C2 cause the green pixel and the blue pixel to couple, resulting in these two pixels changing with the change of the green data line (Data G), thereby changing the original color coordinates and display luminance, resulting in the phenomenon of the color crosstalk. As shown in FIG. 2, a middle part of the frame is where the color crosstalk occurs, the block 1 indicates black and the diagonal block indicates dark green. It is to be noted that FIG. 2 is an exemplary illustration of one cause of the color crosstalk for better understanding.

Based on this, the embodiment of the present disclosure proposes a driving method. It is intended that when the absolute value of the gray scale difference between the color pixel in the to-be-calibrated region and the target color pixel in the target region on the same data line is greater than a preset threshold, the target compensation data is selected from the pre-obtained compensation data set based on the absolute value of the gray scale difference to compensate for the display data of the to-be-calibrated region, and then to drive the to-be-displayed screen, such that the phenomenon of color crosstalk can be improved, thereby improving the display image quality.

Figure 3:
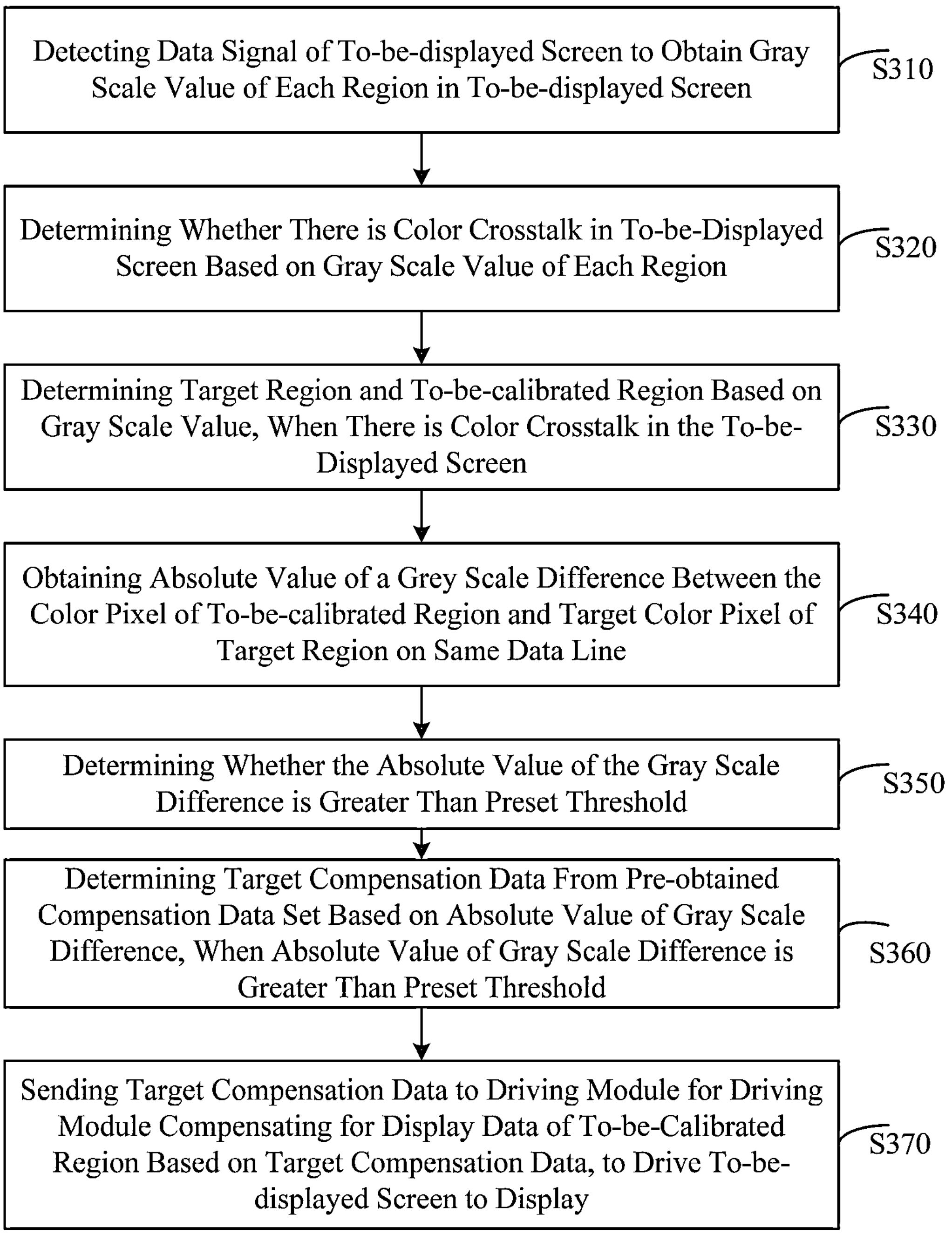
FIG. 3 is a flowchart of a driving method according to embodiments of the present disclosure.

Referring to FIG. 3, FIG. 3 is a flowchart of a driving method according to an embodiment of the present disclosure. As shown in FIG. 3, the driving method is executed by a logic board (TCON) module and includes, but is not limited to, S310 to S370.

S310, detecting a data signal of a to-be-displayed screen to obtain a gray scale value of each region in the to-be-displayed screen.

In an embodiment of the present disclosure, the logic board receives the data signal of the to-be-displayed screen, and after the internal data detector detects the data signal, it can obtain the gray scale value of each region of the to-be-displayed screen, including the gray scale values of the red pixel, the blue pixel and the green pixel in each region.

Exemplarily, the gray scale value of the pure green region is RGB=(0,255,0), the gray scale value of the pure blue region is RGB=(0,0,255), the gray scale value of the pure red region is RGB=(255,0,0), and the gray scale value of the pure black region is RGB=(0,0,0).

S320, determining whether there is a color crosstalk in the to-be-displayed screen based on the gray scale value of each region.

In embodiments of the present disclosure, based on the gray scale value of each region, it can be determined whether there is the target region in the to-be-displayed screen, and the target region is a region where the gray scale value of the red pixel is greater than 0, the gray scale values of the blue pixel and the green pixel are both equal to 0, or the gray scale value of the blue pixel is greater than 0, and the gray scale values of the red pixel and the green pixel are both equal to 0, or the gray scale value of the green pixel is greater than 0, and the gray scale values of the blue pixel and the red pixel are both equal to 0. And the gray scale values of the regions adjacent to the target region on the data line can be obtained, so that it can be determined whether there is the color crosstalk in the to-be-displayed screen.

Figure 4:
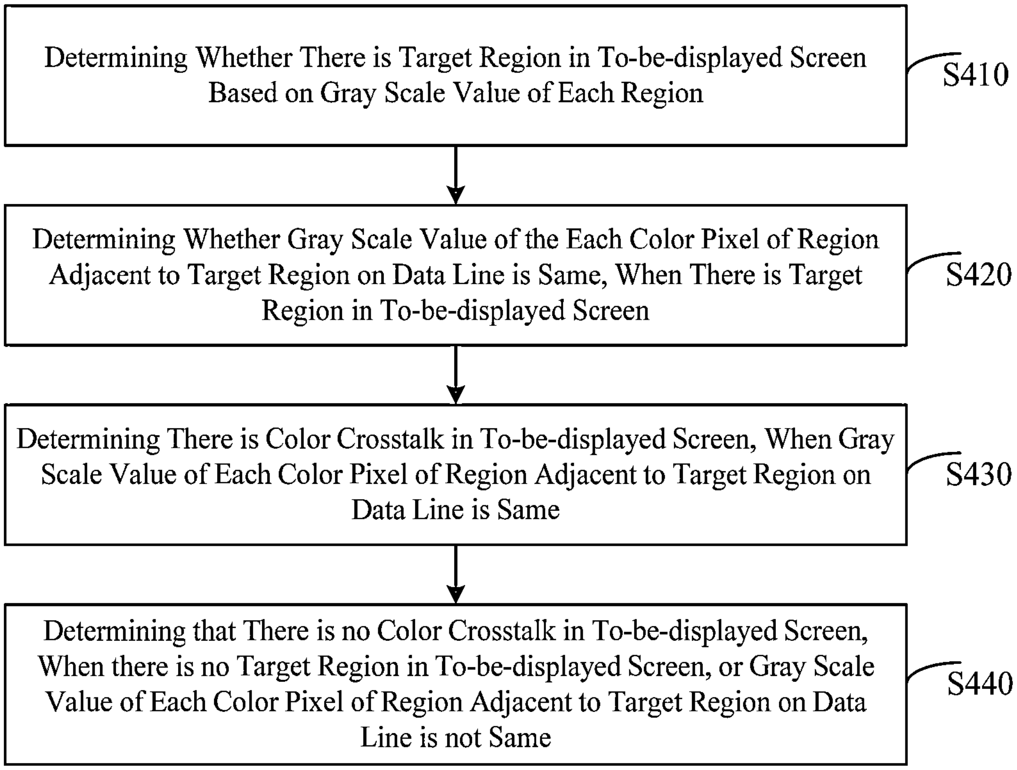
FIG. 4 is a flowchart of determining whether there is a color crosstalk in the to-be-displayed screen based on the gray scale value of each region according to embodiments of the present disclosure.

In one embodiment of the present disclosure, referring to FIG. 4, FIG. 4 is a flowchart of determining whether there is the color crosstalk in the to-be-displayed screen based on the gray scale value of each region according to an embodiment of the present disclosure, including but not limited to S410 to S440.

S410, determining whether there is a target region in the to-be-displayed screen based on the gray scale value of each region.

In an embodiment of the present disclosure, whether there is the target region in the to-be-displayed screen can be directly determined based on the gray scale value of each region. The target region is the region where a gray scale value of the target color pixel is greater than 0, and the gray scale values of the color pixels other than the target color pixel are all equal to 0. The target color pixel is the red pixel, the blue pixel or the green pixel.

Exemplarily, the target region may be a pure red region with a gray scale value 255 of the red pixel, i.e., a region with a gray scale value of RGB=(255, 0, 0), or the target region may be a region with a gray scale value of RGB=(127, 0, 0), or, a region with a gray scale value of RGB=(0, 0, 255), or a region with a gray scale value of RGB=(0, 0, 127), or a region with a gray scale value of RGB=(0, 255, 0), or a region with a gray scale value of RGB=(0, 127, 0), and so on.

S420, determining whether the gray scale value of the each color pixel in the region adjacent to the target region on the data line is the same, when there is the target region in the to-be-displayed screen.

In the embodiment of the present disclosure, when it is determined that there is the target region in the to-be-displayed screen, it is necessary to further determine whether the gray scale value of each color pixel in the region adjacent to the target region on the data line is the same, such that whether there is the color crosstalk in the to-be-displayed screen can be determined.

S430, determining there is the color crosstalk in the to-be-displayed screen, when the gray scale value of each color pixel in the region adjacent to the target region on the data line is the same.

In the embodiment of the present disclosure, after the target region is determined, the gray scale value of each color pixel in the region adjacent to the target region on the data line may be further obtained. If the gray scale value of each color pixel in the region adjacent to the target region on the data line is the same, it can be determined that there is the color crosstalk in the to-be-displayed screen.

S440, determining that there is no color crosstalk in the to-be-displayed screen, when there is no target region in the to-be-displayed screen, or the gray scale value of each color pixel in the region adjacent to the target region on the data line is not the same.

In an embodiment of the present disclosure, when there is no target region in the to-be-displayed screen, i.e., there is no region in the to-be-displayed screen where the gray scale value of the target color pixel is greater than 0 and the gray scale values of the color pixels other than the target color pixel are all equal to 0. At this time, it can be determined that there is no color crosstalk in the to-be-displayed screen, or when there is the target region in the to-be-displayed screen, but the gray scale value of each color pixel in the region adjacent to the target region on the data line is not the same, it can also be determined that there is no color crosstalk in the to-be-displayed screen.

In the embodiments of the present disclosure, when it is determined that there is no color crosstalk in the to-be-displayed screen, there is no need to process the to-be-displayed screen and the to-be-displayed screen can be driven directly. When it is determined that there is the color crosstalk in the to-be-displayed screen, the to-be-displayed screen needs to be processed accordingly and then is driven, so as to improve the problem of color crosstalk, thereby improving display image quality.

S330, determining a target region and a to-be-calibrated region based on the gray scale value, when there is the color crosstalk in the to-be-displayed screen. A gray scale value of target color pixel in the target region is greater than 0, and gray scale values of color pixels in the target region other than the target color pixel are all equal to 0, and the target color pixel is a red pixel, a blue pixel or a green pixel, the to-be-calibrated region is a region adjacent to the target region on a data line, and a gray scale value of each color pixel in the to-be-calibrated region is the same.

In the embodiment of the present disclosure, when it is determined that there is the color crosstalk in the to-be-displayed screen, the target region is first determined based on the gray scale value. The target region is a region where a gray scale value of the target color pixel is greater than 0, and gray scale values of color pixels other than the target color pixel are all equal to 0. The target color pixel is a red pixel, a blue pixel or a green pixel. After the target region is determined, the to-be-calibrated region, i.e., a region affected by color crosstalk, may be further determined based on the target region. The gray scale value of each color pixel in the to-be-calibrated region is the same. Exemplarily, the gray scale value of the to-be-calibrated region may be RGB=(127, 127, 127), RGB=(64, 64, 64), RGB=(32, 32, 32), and so on.

Specifically, the embodiment of the present disclosure considers the problem of color crosstalk in the longitudinal direction, therefore, after the target region is determined, an upper region adjacent to the target region on the data line and a lower region adjacent to the target region on the data line may be determined as the to-be-calibrated region. It should be noted that when the upper edge of the target region just overlaps with the outermost upper edge of the to-be-displayed screen, there will be no upper region in the to-be-calibrated region adjacent to the target region on the data line, but only a lower region adjacent to the target region on the data line. When the lower edge of the target region just overlaps the outermost lower edge of the to-be-displayed screen, there will be no lower region in the to-be-calibrated region adjacent to the target region on the data line, but only an upper region adjacent to the target region on the data line.

S340, obtaining an absolute value of a gray scale difference between the color pixel in the to-be-calibrated region and the target color pixel in the target region on the same data line.

In an embodiment of the present disclosure, after the target region and the to-be-calibrated region are obtained, the absolute value of the gray scale difference between the color pixel in the to-be-calibrated region and the target color pixel in the target region on the same data line may be obtained. Exemplarily, when the gray scale value of the target region is RGB=(255,0,0) or RGB=(127,0,0), the absolute value of the gray scale difference between the red pixel in the to-be-calibrated region and the red pixel in the target region on the red data line (Data R) is obtained. Similarly, when the gray scale value of the target region is RGB=(0, 255, 0) or RGB=(0, 127, 0), the absolute value of the gray scale difference between the green pixel in the to-be-calibrated region and the green pixel in the target region on the green data line (Data G) is obtained. Similarly, when the gray scale value of the target region is RGB=(0, 0, 255) or RGB=(0, 0, 255), the absolute value of the gray scale difference between the blue pixel in the to-be-calibrated region and the blue pixel in the target region on the blue data line (Data B) is obtained.

S350, determining whether the absolute value of the gray scale difference is greater than a preset threshold.

In the embodiment of the present disclosure, after the absolute value of the gray scale difference between the to-be-calibrated region and the target region on the same data line is obtained, the absolute value of the gray scale difference may be compared with the preset threshold, to determine whether the absolute value of the gray scale difference is greater than the preset threshold.

It is to be noted that, in the embodiments of the present disclosure, the preset threshold may be adjusted according to the actual color crosstalk of the display panel, and the embodiments of the present disclosure do not specifically limit the preset threshold.

Exemplarily, the preset threshold is set to be 60 in advance, and when the absolute value of the gray scale difference between the to-be-calibrated region and the target region on the same data line obtained is 64, the absolute value of the gray scale difference can be determined to be greater than the preset threshold. And when the absolute value of the gray scale difference between the to-be-calibrated region and the target region on the same data line obtained is 35, it can be determined that the absolute value of the gray scale difference is not greater than the preset threshold.

S360, determining target compensation data from a pre-obtained compensation data set based on the absolute value of the gray scale difference, when the absolute value of the gray scale difference is greater than the preset threshold.

In an embodiment of the present disclosure, when the absolute value of the gray scale difference is not greater than the preset threshold, it indicates that although there is the gray scale difference between the to-be-calibrated region and the target region, the effect of the gray scale difference on the luminance of the to-be-displayed screen is imperceptible to the human eye, i.e., the effect on the screen quality is small, and the display data of the to-be-calibrated region needn't to be compensated. When the absolute value of the gray scale difference is greater than the preset threshold, it indicates that the gray scale difference between the to-be-calibrated region and the target region has an effect on the luminance of the to-be-displayed screen, i.e. the effect is perceptible by the human eye, i.e., it has a greater effect on the display image quality, and thus the display data of the to-be-calibrated region needs to be compensated, such that the display image quality can be guaranteed. Specifically, when the absolute value of the gray scale difference is greater than the preset threshold, the target compensation data is determined from the pre-obtained compensation data set based on the absolute value of the gray scale difference.

In the embodiments of the present disclosure, the pixel compensation data may be different for different absolute values of the gray scale difference, so it is necessary to determine the corresponding target compensation data according to the specific absolute value of the gray scale difference.

It should be noted that the pixel compensation data corresponding to different absolute values of the gray scale difference may be obtained in advance by processing the standard crosstalk detection screen.

S370, sending the target compensation data to a driver for the driver compensating for display data of the to-be-calibrated region based on the target compensation data, to drive the to-be-displayed screen to display.

In the embodiment of the present disclosure, after the target compensation data is obtained, the logic board controls to output a high level, at which time the N-type metal-oxide-semiconductor (NMOS) transistor conducts, and the logic board outputs the target compensation data to the driver, for the driver compensating for the display data of the to-be-calibrated region based on the target compensation data, to drive the to-be-displayed screen to display.

It should be noted that when the absolute value of the gray scale difference between the to-be-calibrated region and the target region on the same data line is not greater than the preset threshold, the logic board does not need to output the target compensation data, and at this time, the driver needn't to compensate for the display data of the to-be-calibrated region, but directly drives the display data of the to-be-calibrated region to be displayed on the display panel.

The embodiment of the present disclosure can determine whether the display data of the to-be-calibrated region needs to be compensated by comparing the absolute value of the gray scale difference between the to-be-calibrated region and the target region on the same data line with the preset threshold, and when it is determined that the display data of the to-be-calibrated region needs to be compensated, the target compensation data corresponding to the absolute value of the gray scale difference is determined by means of the absolute value of the gray scale difference, and then the target compensation data is sent to the driver, such that the driver can compensate for the display data of the to-be-calibrated region based on the target compensation data, to drive the to-be-displayed screen to display, such that the phenomenon of color crosstalk can be improved, thereby improving the display image quality.

Figure 5:
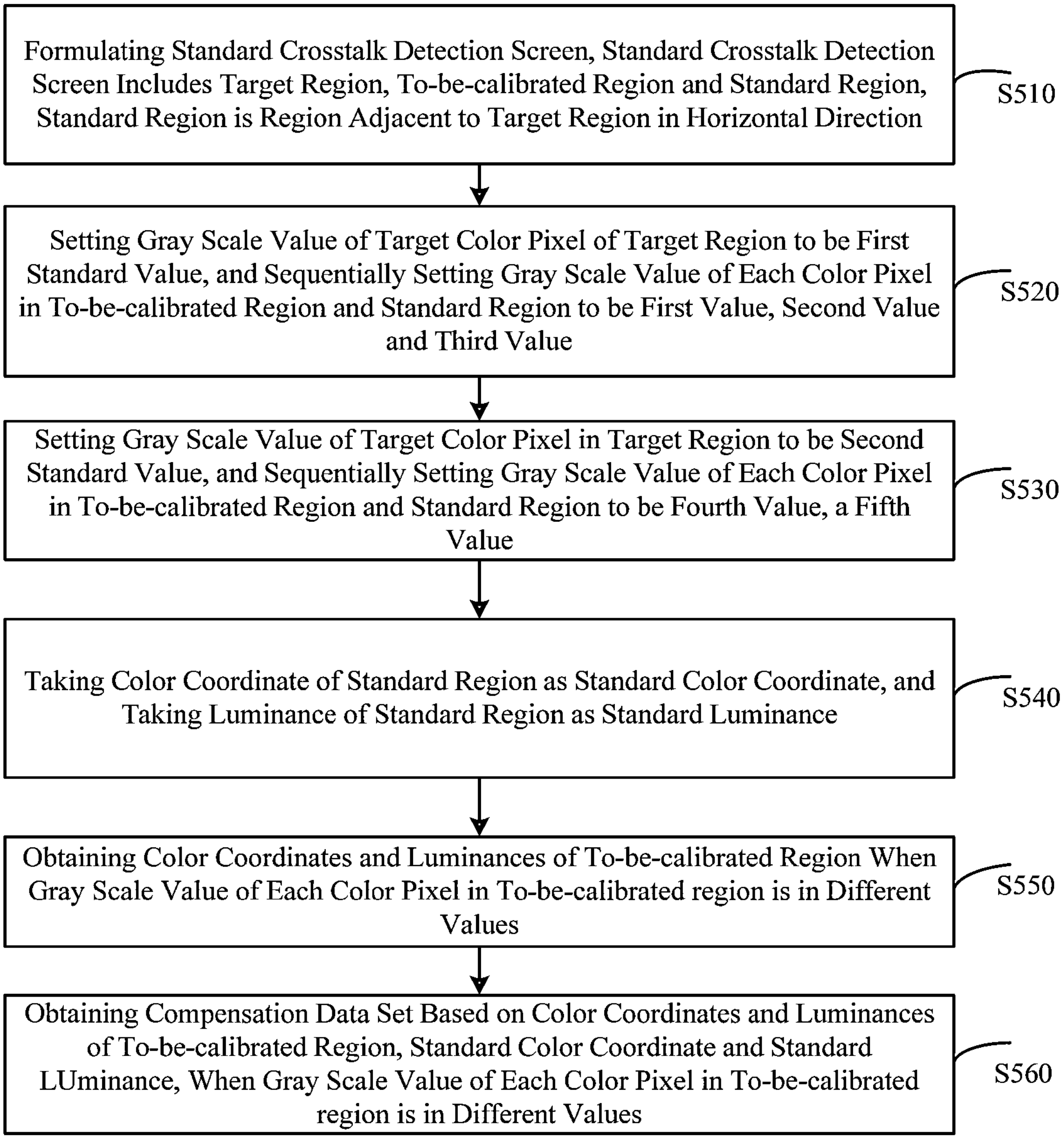
FIG. 5 is a flowchart of obtaining a compensation data set according to embodiments of the present disclosure.

In an embodiment of the present disclosure, referring to FIG. 5, FIG. 5 is a flowchart of obtaining a compensation data set according to an embodiment of the present disclosure, including but not limited to S510 to S560.

S510, formulating a standard crosstalk detection screen, the standard crosstalk detection screen includes the target region, the to-be-calibrated region and a standard region, the standard region is a region adjacent to the target region in a horizontal direction.

In an embodiment of the present disclosure, in order to obtain a compensation data set, the standard crosstalk detection screen is formulated to process. Specifically, the standard crosstalk detection screen includes the target region, the to-be-calibrated region, and the standard region, and the standard region is a region adjacent to the target region in the horizontal direction.

Figure 6:
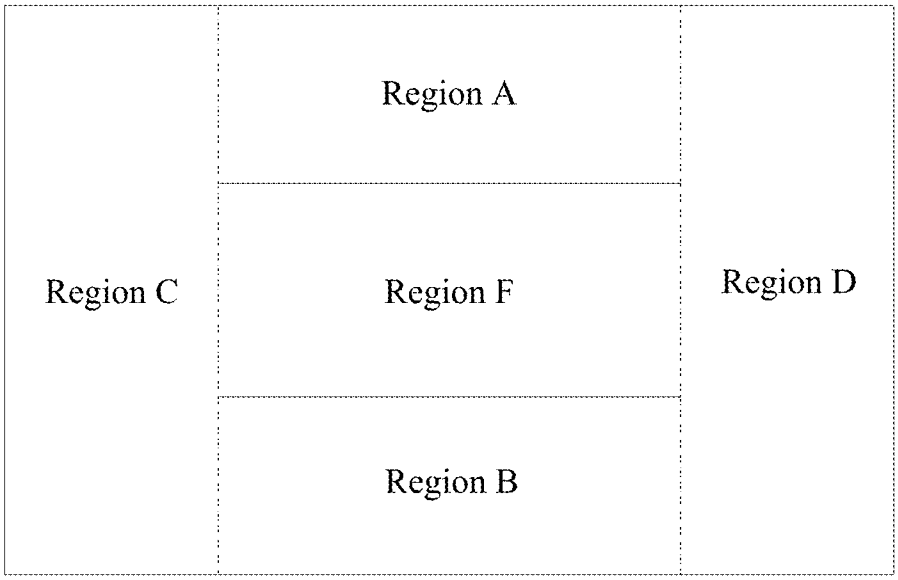
FIG. 6 is a schematic diagram of a standard crosstalk detection screen according to embodiments of the present disclosure.

Exemplarily, referring to FIG. 6, FIG. 6 is an example diagram of a standard crosstalk detection screen according to an embodiment of the present disclosure. As shown in FIG. 6, the entire standard crosstalk detection screen in the embodiment of the present disclosure is divided into five regions, namely, region A, region B, region C, region D, and region F. The region F is the target region, the region A and the region B are the to-be-calibrated regions, and the region C and the region D are the standard regions. The color crosstalk is generally manifested as a situation where the color coordinates of the regions A and B are not the same as those of the regions C and D in the same gray scale, resulting in inconsistent colors. The larger the pixel data jumps, the larger the effect on the corresponding pixel will be.

S520, setting the gray scale value of the target color pixel in the target region to be a first standard value, and sequentially setting the gray scale value of each color pixel in the to-be-calibrated region and the standard region to be a first value, a second value and a third value, the first standard value is greater than 127 and less than or equal to 255, the first value is less than the first standard value, and the first value, the second value and the third value decrease in turn.

In the embodiments of the present disclosure, it is considered that the actual gray scale and the gray scale voltage are in accordance with the gamma 2.2 curve, i.e., the luminance and color coordinate of middle-low gray scale vary little with voltage, and the luminance and color coordinate of middle-high gray scale vary greatly with voltage. Therefore, it is necessary to consider the gray scale value of the region F (target region) for the classification of middle-high gray scale and middle-low gray scale respectively. Specifically, it is necessary to set the gray scale value of the target color pixel in the target region as the first standard value and the second standard value. The first standard value is greater than 127 and less than or equal to 255, i.e., the gray scale value of the target color pixel in the target region belongs to the middle-high gray scale. At this time, the gray scale value of each color pixel in the to-be-calibrated region and the standard region is set to be the first value, the second value, and the third value. The first value is smaller than the first standard value, and the first value, the second value, and the third value decrease in turn.

S530, setting the gray scale value of the target color pixel in the target region to be a second standard value, and sequentially setting the gray scale value of each color pixel in the to-be-calibrated region and the standard region to be a fourth value, a fifth value, the second standard value is greater than 0 and less than or equal to 127, and the fourth value is less than the second standard value, the fourth value and the fifth value decrease in turn.

In the embodiments of the present disclosure, it is considered that the actual gray scale and the gray scale voltage are in accordance with the gamma 2.2 curve, i.e., the luminance and color coordinate of middle-low gray scale vary little with voltage, and the luminance and color coordinate of middle-high gray scale vary greatly with voltage. Therefore, it is necessary to set the gray scale value of the target color pixel in the target region as the second standard value. The second standard value is greater than 0 and less than or equal to 127, i.e., the gray scale value of the target color pixel in the target region belongs to the middle-low gray scale. At this time, the gray scale value of each color pixel in the to-be-calibrated region and the standard region is set to be the fourth value and the fifth value. The fourth value is smaller than the second standard value, and the fourth value and the fifth value decrease in turn.

S540, taking a color coordinate of the standard region as a standard color coordinate, and taking a luminance of the standard region as a standard luminance.

In an embodiment of the present disclosure, after the standard region is determined through a standard crosstalk detection screen and a gray scale value of the standard region is set, the color coordinate of the standard region can be used as the standard color coordinate, and the luminance of the standard region is used as the standard luminance, so that a calibration reference can be provided for the to-be-calibrated region with color crosstalk.

S550, obtaining color coordinates and luminances of the to-be-calibrated region when the gray scale value of each color pixel in the to-be-calibrated region is in different values.

In an embodiment of the present disclosure, since the gray scale value of the target color pixel in the target region is set to be a first standard value, and the gray scale value of each color pixel in the to-be-calibrated region and the standard region are set to be the first value, the second value, and the third value in turn, such that when the gray scale value of the target color pixel in the target region is the first standard value, the color coordinate and luminance of the to-be-calibrated region when in the first value, and the color coordinate and luminance of the to-be-calibrated region when in the second value, the color coordinate and luminance of the to-be-calibrated region when in the third value can be obtained. Similarly, since the gray scale value of the target color pixel in the target region is set to the second standard value, and the gray scale value of each color pixel in the to-be-calibrated region and the standard region is set to the fourth value and the fifth value in turn, such that when the gray scale value of the target color pixel in the target region is the second standard value, the coordinate and luminance of the to-be-calibrated region when in the fourth value, and the color coordinate and luminance of the to-be-calibrated region when in the fifth value can be obtained.

S560, obtaining the compensation data set based on the color coordinates and luminances of the to-be-calibrated region, the standard color coordinate and the standard luminance, when the gray scale value of each color pixel in the to-be-calibrated region is in different values.

In an embodiment of the present disclosure, when the gray scale value of the target color pixel in the target region is the first standard value, the compensation data when in the first value can be obtained based on the color coordinate and luminance of the to-be-calibrated region when in the first value, and the standard color coordinate and the standard luminance when in the first value. Similarly, when the gray scale value of the target color pixel in the target region is the first standard value, the compensation data when in the second value can be obtained based the color coordinate and luminance of the to-be-calibrated region when in the second value, and the standard color coordinate and the standard luminance when in the second value. When the gray scale value of the target color pixel in the target region is the first standard value, the compensation data when in the third value can be obtained based on the gray scale value of the target color pixel in the target region, the color coordinate and luminance of the to-be-calibrated region when in the third value, and the standard color coordinate and the standard luminance when in the third value. When the gray scale value of the target color pixel in the target region is the second standard value, the compensation data when in the fourth value can be obtained based on the color coordinate and luminance of the to-be-calibrated region when in the fourth value, and the standard color coordinate and the standard luminance when in the fourth value. When the gray scale value of the target color pixel in the target region is the second standard value, the compensation data when in the fifth value can be obtained based on the color coordinates and luminance of the to-be-calibrated region when in the fifth value, and the standard color coordinate and the standard luminance when in the fifth value. In this manner, the compensation data set can be obtained.

Figure 7:
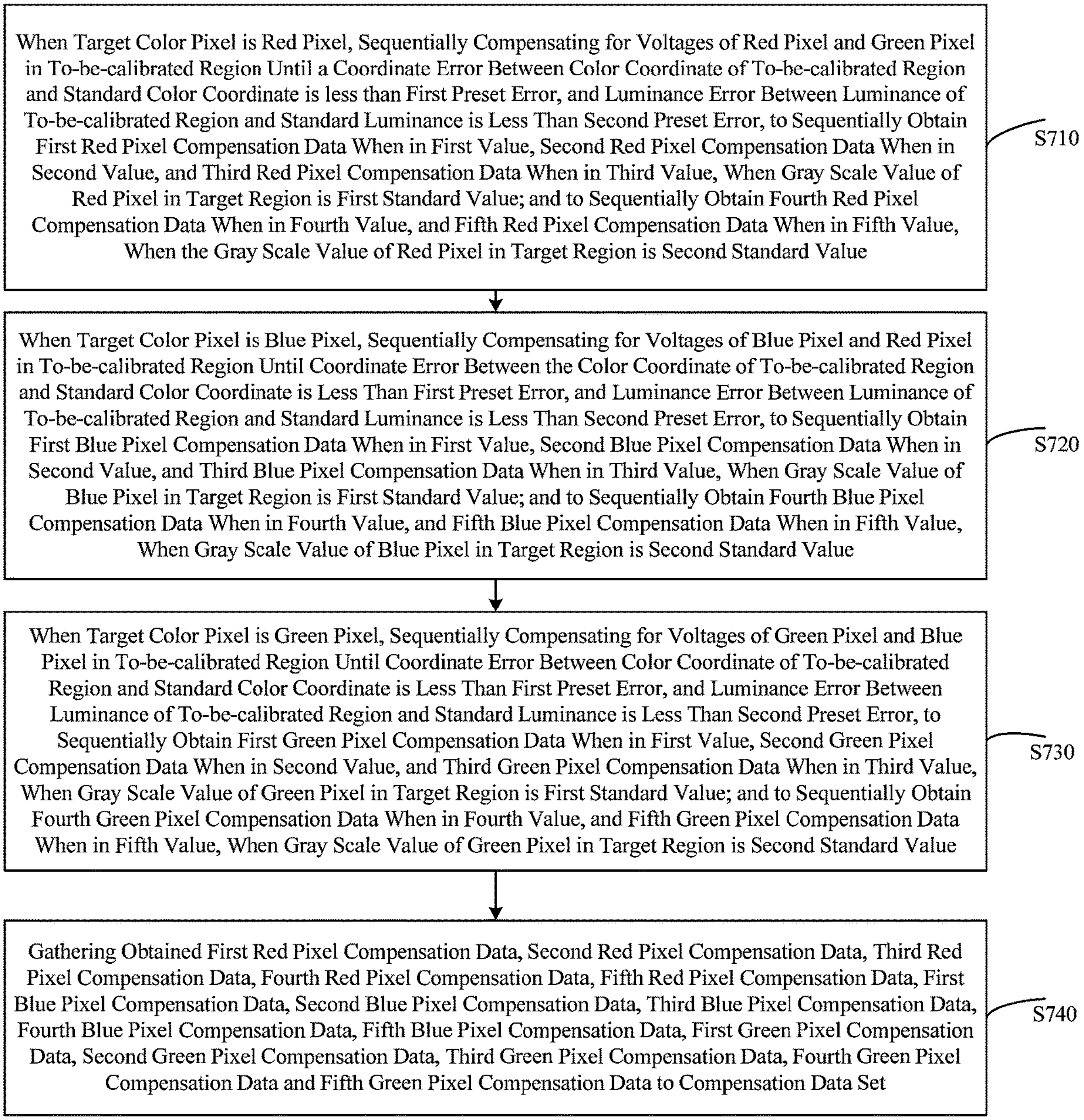
FIG. 7 is a flowchart of obtaining the compensation data set based on the color coordinates and luminances of the to-be-calibrated region, and the standard color coordinate and the standard luminance when the gray scale value of each color pixel in the to-be-calibrated region is in different values, according to embodiments of the present disclosure.

In one embodiment of the present disclosure, referring to FIG. 7, FIG. 7 is a flowchart of obtaining the compensation data set based on the color coordinates and luminances of the to-be-calibrated region, and the standard color coordinate and standard luminance when the gray scale value of each color pixel in the to-be-calibrated region is in different values according to the embodiment of the present disclosure, including but not limited to S710 to S740.

S710, when the target color pixel is the red pixel, sequentially compensating for voltages of the red pixel and the green pixel in the to-be-calibrated region until a coordinate error between the color coordinate of the to-be-calibrated region and the standard color coordinate is less than a first preset error, and a luminance error between the luminance of the to-be-calibrated region and the standard luminance is less than a second preset error, to sequentially obtain a first red pixel compensation data when in the first value, a second red pixel compensation data when in the second value, and a third red pixel compensation data when in the third value, when the gray scale value of the red pixel in the target region is the first standard value; and to sequentially obtain a fourth red pixel compensation data when in the fourth value, and a fifth red pixel compensation data when in the fifth value, when the gray scale value of the red pixel in the target region is the second standard value.

In the embodiment of the present disclosure, when the target color pixel is the red pixel, that is, the target region is a region where the gray scale value of the red pixel is greater than 0, and the gray scale values of the blue pixel and the green pixel are all equal to 0. At this time, voltages of the red pixel and the green pixel in the to-be-calibrated region need to be compensated in turn until the coordinate error between the color coordinate of the to-be-calibrated region and the standard color coordinate is less than the first preset error, and the luminance error between the luminance of the to-be-calibrated region and the standard luminance is less than the second preset error, so as to obtain each red pixel compensation data sequentially when the target color pixel is the red pixel.

Exemplarily, when the target color pixel is the red pixel, i.e., the region F is set to be a red screen, the gray scale value of the red pixel in the target region may be set to the first standard value, such as the gray scale value is RGB=(255, 0, 0), and the gray scale values of both the to-be-calibrated region and the standard region are set to be RGB=(127, 127, 127). Considering that the regions A and B will be affected by the crosstalk of the region F (target region), resulting in that there is the difference between the color coordinates of the regions A and B and the color coordinate of the region C or D, and there also is the difference between the luminances of the regions A and B and the luminance of the region C or D. Therefore, it is necessary to use the color coordinate of the region C or D as the standard color coordinate and the luminance of the region C or D as the standard luminance. By compensating for voltages of the red pixel and the green pixel in the region A or B, so that the coordinate error between the color coordinates of the region A or B and the standard color coordinate is less than the first preset error, and the luminance error between the luminance of the region A or B and the standard luminance is less than the second preset error, the first red pixel compensation data at this time is stored in the compensation table T1_1. In this way, the gray scale value of the region F is set to be RGB=(255,0,0) and the gray scale values of both the to-be-calibrated region and the standard region are set to be RGB=(64,64,64), the second red pixel compensation data can be obtained and stored in the compensation table T1_2. The gray scale value of the region F is set to be RGB=(255, 0,0), and the gray scale values of both the to-be-calibrated region and the standard region are set to be RGB=(32,32, 32), the third red pixel compensation data can be obtained and stored in the compensation table T1_3.

Similarly, when the target color pixel is the red pixel, i.e., the region F is set to be a red screen, the gray scale value of the red pixel in the target region can be set to be the second standard value, for example, the gray scale value of the region F is set to be RGB=(127,0,0), and the gray scale values of both the to-be-calibrated region and the standard region are set to be RGB=(64,64,64), and the fourth red pixel compensation data can be obtained and stored in the compensation table T1_4. The gray scale value of the region F is set to be RGB=(127, 0, 0), and the gray scale values of both the to-be-calibrated region and the standard region are set to be RGB=(32,32,32), a fifth red pixel compensation data can be obtained and stored in the compensation table T1_5. Referring to Table 1, which is the compensation table of the corresponding compensation data when the region F is the red screen.

Table 1 is the compensation table of the corresponding compensation data when the region F is the red screen

| | A/B Region | | |
|---|---|---|---|
| F Region | RGB = (127, 127, 127) | RGB = (64, 64, 64) | RGB = (32, 32, 32) |
| RGB = (255, 0, 0) | T1_1 | T1_2 | T1_3 |
| RGB = (127, 0, 0) | / | T1_4 | T1_5 |

S720, when the target color pixel is the blue pixel, sequentially compensating for voltages of the blue pixel and the red pixel in the to-be-calibrated region until the coordinate error between the color coordinate of the to-be-calibrated region and the standard color coordinate is less than the first preset error, and the luminance error between the luminance of the to-be-calibrated region and the standard luminance is less than the second preset error, to sequentially obtain a first blue pixel compensation data when in the first value, a second blue pixel compensation data when in the second value, and a third blue pixel compensation data when in the third value, when the gray scale value of the blue pixel in the target region is the first standard value; and to sequentially obtain a fourth blue pixel compensation data when in the fourth value, and a fifth blue pixel compensation data when in the fifth value, when the gray scale value of the blue pixel in the target region is the second standard value.

In the embodiment of the present disclosure, when the target color pixel is the blue pixel, that is, the target region is a region where the gray scale value of the blue pixel is greater than 0, and the gray scale values of the red pixel and the green pixel are all equal to 0. At this time, voltages of the blue pixel and the red pixel in the to-be-calibrated region need to be compensated in turn until the coordinate error between the color coordinate of the to-be-calibrated region and the standard color coordinate is less than the first preset error, and the luminance error between the luminance of the to-be-calibrated region and the standard luminance is less than the second preset error, so as to obtain each blue pixel compensation data sequentially when the target color pixel is the blue pixel.

Exemplarily, when the target color pixel is the blue pixel, i.e., the region F is set to be a blue screen, the gray scale value of the blue pixel in the target region may be set to the first standard value, such as the gray scale value is RGB=(0, 0, 255), and the gray scale values of both the to-be-calibrated region and the standard region are set to be RGB=(127, 127, 127). Considering that the regions A and B will be affected by the crosstalk of the region F, resulting in that there is the difference between the color coordinate of the region A and the color coordinate of the region C or D, and there also is the difference between the luminances of the regions A and B and the luminance of the region C or D, and the difference between the luminance of the region B and the luminance of the region C or D. Therefore, it is necessary to use the color coordinate of the region C or D as the standard color coordinate and the luminance of the region C or D as the standard luminance. By compensating for voltages of the blue pixel and the red pixel in the region A or B, so that the coordinate error between the color coordinates of the region A or B and the standard color coordinate is less than the first preset error, and the luminance error between the luminance of the region A or B and the standard luminance is less than the second preset error, the first blue pixel compensation data at this time is stored in the compensation table T2_1. In this way, the gray scale value of the region F is set to be RGB=(0,0,255) and the gray scale values of both the to-be-calibrated region and the standard region are set to be RGB=(64,64,64), the second blue pixel compensation data can be obtained and stored in the compensation table T2_2. The gray scale value of the region F is set to be RGB=(0, 0,255), and the gray scale values of both the to-be-calibrated region and the standard region are set to be RGB=(32,32, 32), the third blue pixel compensation data can be obtained and stored in the compensation table T2_3.

Similarly, when the target color pixel is the blue pixel, i.e., the region F is set to be a blue screen, the gray scale value of the blue pixel in the target region can be set to be the second standard value, for example, the gray scale value of the region F is set to be RGB=(0,0,127), and the gray scale values of both the to-be-calibrated region and the standard region are set to be RGB=(64,64,64), and the fourth blue pixel compensation data can be obtained and stored in the compensation table T2_4. The gray scale value of the region F is set to be RGB=(0, 0, 127), and the gray scale values of both the to-be-calibrated region and the standard region are set to be RGB=(32,32,32), a fifth blue pixel compensation data can be obtained and stored in the compensation table T2_5. Referring to Table 2, which is the compensation table of the corresponding compensation data when the region F is the blue screen.

Table 2 is the compensation table of the corresponding compensation data when the region F is the blue screen

| | A/B Region | | |
|---|---|---|---|
| F Region | RGB = (127, 127, 127) | RGB = (64, 64, 64) | RGB = (32, 32, 32) |
| RGB = (0, 0, 255) | T2_1 | T2_2 | T2_3 |
| RGB = (0, 0, 127) | / | T2_4 | T2_5 |

S730, when the target color pixel is the green pixel, sequentially compensating for voltages of the green pixel and the blue pixel in the to-be-calibrated region until the coordinate error between the color coordinate of the to-be-calibrated region and the standard color coordinate is less than the first preset error, and the luminance error between the luminance of the to-be-calibrated region and the standard luminance is less than the second preset error, to sequentially obtain a first green pixel compensation data when in the first value, a second green pixel compensation data when in the second value, and a third green pixel compensation data when in the third value, when the gray scale value of the green pixel in the target region is the first standard value; and to sequentially obtain a fourth green pixel compensation data when in the fourth value, and a fifth green pixel compensation data when in the fifth value, when the gray scale value of the green pixel in the target region is the second standard value.

In the embodiment of the present disclosure, when the target color pixel is the green pixel, that is, the target region is a region where the gray scale value of the green pixel is greater than 0, and the gray scale values of the red pixel and the blue pixel are all equal to 0. At this time, voltages of the green pixel and the blue pixel in the to-be-calibrated region need to be compensated in turn until the coordinate error between the color coordinate of the to-be-calibrated region and the standard color coordinate is less than the first preset error, and the luminance error between the luminance of the to-be-calibrated region and the standard luminance is less than the second preset error, so as to obtain each green pixel compensation data sequentially when the target color pixel is the green pixel.

Exemplarily, when the target color pixel is the green pixel, i.e., the region F is set to be a green screen, the gray scale value of the green pixel in the target region may be set to the first standard value, such as the gray scale value is RGB=(0, 255, 0), and the gray scale values of both the to-be-calibrated region and the standard region are set to be RGB=(127, 127, 127). Considering that the regions A and B will be affected by the crosstalk of the region F, resulting in that there is the difference between the color coordinates of the regions A and B and the color coordinate of the region C or D, and there also is the difference between the luminances of the regions A and B and the luminance of the region C or D. Therefore, it is necessary to use the color coordinate of the region C or D as the standard color coordinate and the luminance of the region C or D as the standard luminance. By compensating for voltages of the green pixel and the blue pixel in the region A or B, so that the coordinate error between the color coordinate of the region A or B and the standard color coordinate is less than the first preset error, and the luminance error between the luminance of the region A or B and the standard luminance is less than the second preset error, the first green pixel compensation data at this time is stored in the compensation table T3_1. In this way, the gray scale value of the region F is set to be RGB=(0, 255,0) and the gray scale values of both the to-be-calibrated region and the standard region are set to be RGB=(64,64, 64), the second green pixel compensation data can be obtained and stored in the compensation table T3_2. The gray scale value of the region F is set to be RGB=(0,255,0), and the gray scale values of both the to-be-calibrated region and the standard region are set to be RGB=(32,32,32), the third green pixel compensation data can be obtained and stored in the compensation table T3_3.

Similarly, when the target color pixel is the green pixel, i.e., the region F is set to be a green screen, the gray scale value of the green pixel in the target region can be set to be the second standard value, for example, the gray scale value of the region F is set to be RGB=(0,127,0), and the gray scale values of both the to-be-calibrated region and the standard region are set to be RGB=(64,64,64), and the fourth green pixel compensation data can be obtained and stored in the compensation table T3_4. The gray scale value of the region F is set to be RGB=(0, 127, 0), and the gray scale values of both the to-be-calibrated region and the standard region are set to be RGB=(32,32,32), a fifth green pixel compensation data can be obtained and stored in the compensation table T3_5. Referring to Table 3, which is the compensation table of the corresponding compensation data when the region F is the green screen.

Table 3 is the compensation table of the corresponding compensation data when the region F is the green screen

| | A/B Region | | |
|---|---|---|---|
| F Region | RGB = (127, 127, 127) | RGB = (64, 64, 64) | RGB = (32, 32, 32) |
| RGB = (0, 255, 0) | T3_1 | T3_2 | T3_3 |
| RGB = (0, 127, 0) | / | T3_4 | T3_5 |

It is to be noted that the first preset error and the second preset error may be adjusted according to the requirements for the display image quality. Exemplarily, the first preset error may be 0.008%, that is, the difference between X1 in the color coordinate of the region A or B and X0 in the standard color coordinate of the region C or D is less than 0.008%, and the difference between Y1 in the standard color coordinate of the region A or B and Y0 in the color coordinate of the region C or D is also less than 0.008%. Exemplarily, the second preset error may be 2%, that is, the difference between the luminance of the region A or B and the standard luminance of the region C or D is less than 2%.

S740, gathering the obtained first red pixel compensation data, the second red pixel compensation data, the third red pixel compensation data, the fourth red pixel compensation data, the fifth red pixel compensation data, the first blue pixel compensation data, the second blue pixel compensation data, the third blue pixel compensation data, the fourth blue pixel compensation data, the fifth blue pixel compensation data, the first green pixel compensation data, the second green pixel compensation data, the third green pixel compensation data, the fourth green pixel compensation data and the fifth green pixel compensation data to the compensation data set.

In an embodiment of the present disclosure, when the target region is of different colors, the compensation data of the gray scale values of the to-be-calibrated region and the standard region when the gray scale value of each color pixel in the to-be-calibrated region is in different values may be gathered to obtain the compensation data set. When the color crosstalk of the to-be-displayed screen is subsequently determined to exist and needs to be processed, the corresponding compensation data may be directly selected from the compensation data set for compensation, so as to improve the color crosstalk, thereby improving the display image quality.

Figure 8:
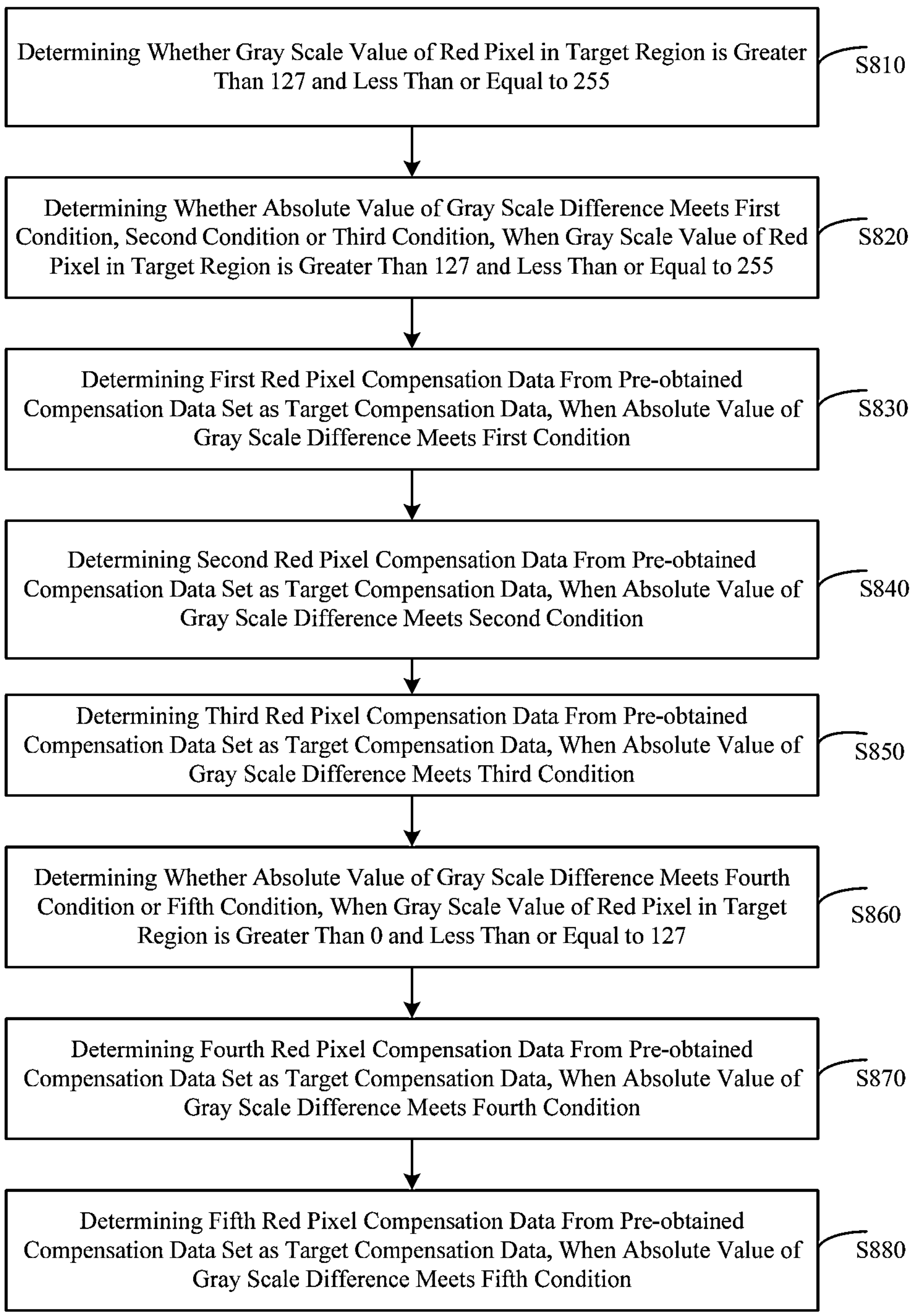
FIG. 8 is a flowchart showing steps that are performed when the target color pixel is the red pixel and the absolute value of the gray scale difference is greater than a preset threshold according to embodiments of the present disclosure.

In one embodiment of the present disclosure, referring to FIG. 8, FIG. 8 is a flowchart of steps that are performed when the target color pixel is the red pixel and the absolute value of the gray scale difference is greater than the preset threshold according to the embodiment of the present disclosure, including but not limited to S810 to S880.

S810, determining whether the gray scale value of the red pixel in the target region is greater than 127 and less than or equal to 255.

In an embodiment of the present disclosure, after the target region and the to-be-calibrated region are determined, the absolute value of the gray scale difference between the color pixel in the to-be-calibrated region and the target color pixel in the target region on the same data line may be obtained. At this time, if the target color pixel is the red pixel, the gray scale values of the red pixels in the target region and the to-be-calibrated region may be obtained, so as to obtain the absolute value of the gray scale difference of the red pixel. If the absolute value of the gray scale difference is greater than the preset threshold, it is determined that the effect of the color crosstalk is so large that it is perceptible by the human eye, and therefore it is necessary to select the corresponding compensation data from the preset compensation data set to compensate for the display data of the to-be-calibrated region accordingly. As to which compensation data is to be selected, it is necessary to first determine whether the gray scale value of the red pixel in the target region is greater than 127 and less than or equal to 255, i.e., to determine whether the gray scale value of the red pixel in the target region at this time is a middle-high gray scale value.

S820, determining whether the absolute value of the gray scale difference meets a first condition, a second condition or a third condition, when the gray scale value of the red pixel in the target region is greater than 127 and less than or equal to 255. The first condition is that the absolute value of the gray scale difference is greater than the preset threshold but less than or equal to the first absolute value. The second condition is that the absolute value of the gray scale difference is greater than the first absolute value but less than or equal to the second absolute value. And the third condition is that the absolute value of the gray scale difference is greater than the second absolute value but less than or equal to 255. The first absolute value is an absolute value of a difference between the first standard value and the first value, and the second absolute value is an absolute value of a difference between the first standard value and the second value.

In an embodiment of the present disclosure, when the gray scale value of the red pixel in the target region is greater than 127 and less than or equal to 255, it is necessary to further determine whether the absolute value of the gray scale difference meets the first condition, the second condition, or the third condition, so that it can be determined which compensation data should be selected for the corresponding compensation process based on the conditions met by the absolute value of the gray scale difference.

S830, determining the first red pixel compensation data from the pre-obtained compensation data set as the target compensation data, when the absolute value of the gray scale difference meets the first condition.

In an embodiment of the present disclosure, when the absolute value of the gray scale difference of the red pixel meets the first condition, i.e., when the absolute value of the gray scale difference of the red pixel is greater than the preset threshold but less than or equal to the first absolute value, the corresponding first red pixel compensation data is selected from the compensation data set.

Exemplarily, when the gray scale value of the red pixel in the target region (region F) is 255 and the gray scale value of the red pixel in the to-be-calibrated region (region A or B) is 132, the absolute value of the gray scale difference between the red pixels in the to-be-calibrated region and the target region can be determined to be 123. Since the preset threshold is set to be 60, the first standard value is set to be 255, and the first value is set to be 127, a first absolute value can be determined as 128. Due to 123∈(60,128] therefore, the compensation data T1_1 may be selected from the compensation table 1 for corresponding compensation process.

S840, determining the second red pixel compensation data from the pre-obtained compensation data set as the target compensation data, when the absolute value of the gray scale difference meets the second condition.

In the embodiment of the present disclosure, when the absolute value of the gray scale difference of the red pixel meets the second condition, i.e., when the absolute value of the gray scale difference of the red pixel is greater than the first absolute value but less than or equal to the second absolute value, the corresponding second red pixel compensation data is selected from the compensation data set for the corresponding compensation process.

Exemplarily, when the gray scale value of the red pixel in the target region (region F) is 255 and the gray scale value of the red pixel in the to-be-calibrated region (region A or B) is 74, the absolute value of the gray scale difference between the red pixels in the to-be-calibrated region and the target region can be determined as 181. Since the preset threshold is set to be 60, the first standard value is set to be 255, the first value is set to be 127 and the second value is set to be 64, the first absolute value can be determined as 128 and the second absolute value can be determined as 191. Due to 181∈(128,191], therefore, the pixel compensation data T1_2 can be selected from the compensation table 1 for corresponding compensation process.

S850, determining the third red pixel compensation data from the pre-obtained compensation data set as the target compensation data, when the absolute value of the gray scale difference meets the third condition.

In an embodiment of the present disclosure, when the absolute value of the gray scale difference of the red pixel meets the third condition, i.e., when the absolute value of the gray scale difference of the red pixel is greater than the second absolute value but less than or equal to 255, the corresponding third red pixel compensation data is selected from the compensation data set for the corresponding compensation process.

Exemplarily, when the gray scale value of the red pixel in the target region (region F) is 255 and the gray scale value of the red pixel in the to-be-calibrated region (region A or B) is 32, the absolute value of the gray scale difference between the red pixels in the to-be-calibrated region and the target region can be determined as 223. Since the preset threshold is set to be 60, the first standard value is set to be 255, the first value is set to be 127 and the second value is set to be 64, the first absolute value can be determined as 128 and the second absolute value can be determined as 191. Due to 223∈(191,255], therefore, the pixel compensation data T1_3 can be selected from the compensation table 1 for corresponding compensation process.

S860, determining whether the absolute value of the gray scale difference meets a fourth condition or a fifth condition, when the gray scale value of the red pixel in the target region is greater than 0 and less than or equal to 127, wherein the fourth condition is greater than the preset threshold but less than or equal to the third value, the fifth condition is greater than the third value but less than or equal to 127, and the third value is an absolute value of a difference between the second standard value and the fourth value.

In embodiments of the present disclosure, when the gray scale value of the red pixel in the target region is greater than 0 and less than or equal to 127, it is necessary to further determine whether the absolute value of the gray scale difference meets the fourth condition or the fifth condition, so that it can be determined which compensation data should be selected for the corresponding compensation process based on the conditions met by the absolute value of the gray scale difference.

S870, determining the fourth red pixel compensation data from the pre-obtained compensation data set as the target compensation data, when the absolute value of the gray scale difference meets the fourth condition.

In an embodiment of the present disclosure, when the absolute value of the gray scale difference of the red pixel meets the fourth condition, i.e., when the absolute value of the gray scale difference of the red pixel is greater than the preset threshold but less than or equal to the third value, the corresponding fourth red pixel compensation data is selected from the compensation data set for the corresponding compensation process.

Exemplarily, when the gray scale value of the red pixel in the target region (region F) is 127 and the gray scale value of the red pixel in the to-be-calibrated region (region A or B) is 64, the absolute value of the gray scale difference between the red pixels in the to-be-calibrated region and the target region can be determined as 63. Since the preset threshold is set to be 60, the second standard value is set to be 127, the fourth value is set to be 64 and the fifth value is set to be 64, the third value can be determined as 63. Due to 63∈(60,63], therefore, the compensation data T1_4 can be selected from the compensation table 1 for corresponding compensation process.

S880, determining the fifth red pixel compensation data from the pre-obtained compensation data set as the target compensation data, when the absolute value of the gray scale difference meets the fifth condition.

In the embodiment of the present disclosure, when the absolute value of the gray scale difference of the red pixel meets the fourth condition, i.e., when the absolute value of the gray scale difference of the red pixel is greater than the third value but less than or equal to 127, the corresponding fifth red pixel compensation data is selected from the compensation data set for the corresponding compensation process.

Exemplarily, when the gray scale value of the red pixel in the target region (region F) is 127 and the gray scale value of the red pixel in the to-be-calibrated region (region A or B) is 43, the absolute value of the gray scale difference between the red pixels in the to-be-calibrated region and the target region can be determined as 84. Since the preset threshold is set to be 60, the second standard value is set to be 127, the fourth value is set to be 64 and the fifth value is set to be 32, the third value can be determined as 63. Due to 84∈(63, 127], therefore, the compensation data T1_5 can be selected from the compensation table 1 for corresponding compensation process.

It should be noted that the preset thresholds can be adjusted based on the actual color crosstalk of the display panel. During the driving process of the to-be-displayed screen where there is the color crosstalk, different preset thresholds can be output based on the gray scale value of the target region (region F). Exemplarily, when the target region is a region where a gray scale value of the red pixel is greater than 127 and less than or equal to 255, the first preset threshold can be output. When the target region is a region where a gray scale value of the red pixel is greater than 0 and less than or equal to 127, a second preset threshold can be output. The first preset threshold and the second preset threshold may be the same or different.

Figure 9:
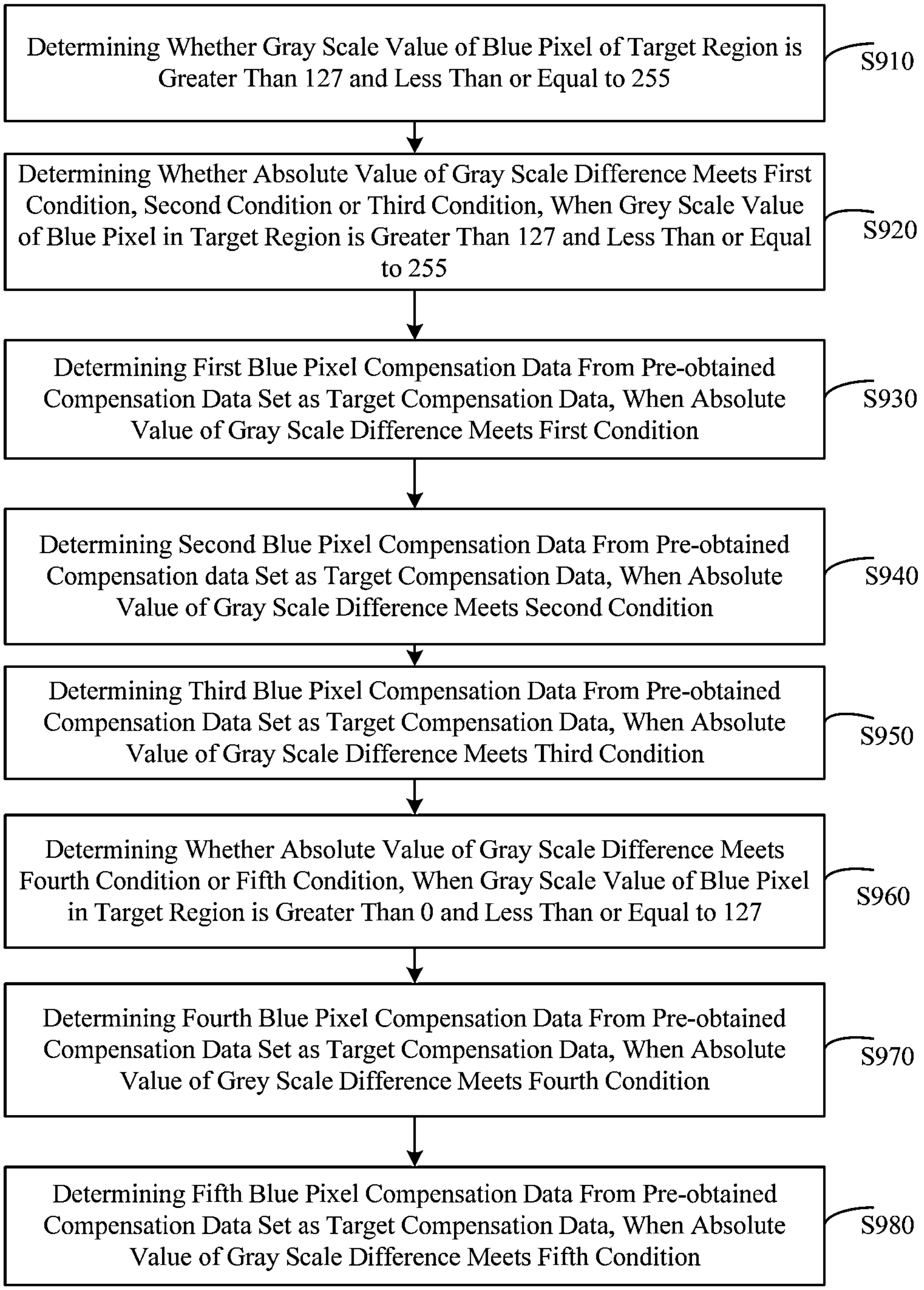
FIG. 9 is a flowchart showing steps that are performed when the target color pixel is the blue pixel and the absolute value of the gray scale difference is greater than the preset threshold according to embodiments of the present disclosure.

In an embodiment of the present disclosure, referring to FIG. 9, FIG. 9 is a flowchart of steps that are performed when the target color pixel is a blue pixel and the absolute value of the gray scale difference is greater than the preset threshold according to the embodiment of the present disclosure, including but not limited to S910 to S980.

S910, determining whether the gray scale value of the blue pixel in the target region is greater than 127 and less than or equal to 255.

In an embodiment of the present disclosure, after the target region and the to-be-calibrated region are determined, the absolute value of the gray scale difference between the color pixel in the to-be-calibrated region and the target color pixel in the target region on the same data line may be obtained. At this time, if the target color pixel is the blue pixel, the gray scale values of the blue pixels in the target region and the to-be-calibrated region may be obtained, so as to obtain the absolute value of the gray scale difference of the blue pixel. If the absolute value of the gray scale difference is greater than the preset threshold, it is determined that the effect of the color crosstalk is so large that it is perceptible by the human eye, and therefore it is necessary to select the corresponding compensation data from the preset compensation data set to compensate for the display data of the to-be-calibrated region accordingly. As to which compensation data is to be selected, it is necessary to first determine whether the gray scale value of the blue pixel in the target region is greater than 127 and less than or equal to 255, i.e., to determine whether the gray scale value of the blue pixel in the target region at this time is a middle-high gray scale value.

S920, determining whether the absolute value of the gray scale difference meets a first condition, a second condition or a third condition, when the gray scale value of the blue pixel in the target region is greater than 127 and less than or equal to 255. The first condition is that the absolute value of the gray scale difference is greater than the preset threshold but less than or equal to the first absolute value, the second condition is that the absolute value of the gray scale difference is greater than the first absolute value but less than or equal to the second absolute value, and the third condition is that the absolute value of the gray scale difference is greater than the second absolute value but less than or equal to 255, and the first absolute value is an absolute value of a difference between the first standard value and the first value, and the second absolute value is an absolute value of a difference between the first standard value and the second value.

In an embodiment of the present disclosure, when the gray scale value of the blue pixel in the target region is greater than 127 and less than or equal to 255, it is necessary to further determine whether the absolute value of the gray scale difference meets the first condition, the second condition, or the third condition, so that it can be determined which compensation data should be selected for the corresponding compensation process based on the conditions met by the absolute value of the gray scale difference.

S930, determining the first blue pixel compensation data from the pre-obtained compensation data set as the target compensation data, when the absolute value of the gray scale difference meets the first condition.

In an embodiment of the present disclosure, when the absolute value of the gray scale difference of the blue pixel meets the first condition, i.e., when the absolute value of the gray scale difference of the blue pixel is greater than the preset threshold but less than or equal to the first absolute value, the corresponding first blue pixel compensation data is selected from the compensation data set.

Exemplarily, when the gray scale value of the blue pixel in the target region (region F) is 255 and the gray scale value of the blue pixel in the to-be-calibrated region (region A or B) is 132, the absolute value of the gray scale difference between the blue pixels in the to-be-calibrated region and the target region can be determined as 123. Since the preset threshold is set to be 60, the first standard value is set to be 255, and the first value is set to be 127, a first absolute value can be determined as 128. Due to 123∈(60,128], therefore, the compensation data T2_1 may be selected from the compensation table 2 for corresponding compensation process.

S940, determining the second blue pixel compensation data from the pre-obtained compensation data set as the target compensation data, when the absolute value of the gray scale difference meets the second condition.

In an embodiment of the present disclosure, when the absolute value of the gray scale difference of the blue pixel meets the second condition, i.e., when the absolute value of the gray scale difference of the blue pixel is greater than the first absolute value but less than or equal to the second absolute value, the corresponding second blue pixel compensation data is selected from the set of compensation data for the corresponding compensation process.

Exemplarily, when the gray scale value of the blue pixel in the target region (region F) is 255 and the gray scale value of the blue pixel in the to-be-calibrated region (region A or B) is 74, the absolute value of the gray scale difference between the blue pixels in the to-be-calibrated region and the target region can be determined as 181. Since the preset threshold is set to be 60, the first standard value is set to be 255, and the first value is set to be 127, a second value is set to be 64, then the first absolute value can be determined as 128, and the second absolute value can be determined as 191. Due to 181∈(128,191], therefore, the compensation data T2_2 may be selected from the compensation table 2 for corresponding compensation process.

S950, determining the third blue pixel compensation data from the pre-obtained compensation data set as the target compensation data, when the absolute value of the gray scale difference meets the third condition.

In an embodiment of the present disclosure, when the absolute value of the gray scale difference of the blue pixel meets the third condition, i.e., when the absolute value of the gray scale difference of the blue pixel is greater than the second absolute value but less than or equal to 255, the corresponding third blue pixel compensation data is selected from the compensation data set for the corresponding compensation process.

Exemplarily, when the gray scale value of the blue pixel in the target region (region F) is 255 and the gray scale value of the blue pixel in the to-be-calibrated region (region A or B) is 32, the absolute value of the gray scale difference between the blue pixels in the to-be-calibrated region and the target region can be determined as 223. Since the preset threshold is set to be 60, a first standard value is set to be 255, a first value is set to be 127, and a second value is set to be 64, the first absolute value can be determined as 128 and the second absolute value can be determined as 191. Due to 223∈(191,255], therefore, the compensation data T2_3 can be selected from the compensation table 2 for corresponding compensation process.

S960, determining whether the absolute value of the gray scale difference meets a fourth condition or a fifth condition, when the gray scale value of the blue pixel in the target region is greater than 0 and less than or equal to 127. The fourth condition is greater than the preset threshold but less than or equal to the third value, the fifth condition is greater than the third value but less than or equal to 127, and the third value is an absolute value of a difference between the second standard value and the fourth value.

In an embodiment of the present disclosure, when the gray scale value of the blue pixel in the target region is greater than 0 and less than or equal to 127, it is necessary to further determine whether the absolute value of the gray scale difference meets the fourth condition or the fifth condition, so that it can be determined which compensation data should be selected for the corresponding compensation process based on the conditions met by the absolute value of the gray scale difference.

S970, determining the fourth blue pixel compensation data from the pre-obtained compensation data set as the target compensation data, when the absolute value of the gray scale difference meets the fourth condition.

In an embodiment of the present disclosure, when the absolute value of the gray scale difference of the blue pixel meets the fourth condition, i.e., when the absolute value of the gray scale difference of the blue pixel is greater than the preset threshold but less than or equal to the third value, the corresponding fourth blue pixel compensation data is selected from the set of compensation data for the corresponding compensation process.

Exemplarily, when the gray scale value of the blue pixel in the target region (region F) is 127 and the gray scale value of the blue pixel in the to-be-calibrated region (region A or B) is 64, the absolute value of the gray scale difference between the blue pixels in the to-be-calibrated region and the target region can be determined as 63. Since the preset threshold is set to be 60, a second standard value is set to be 127, a fourth value is set to be 64 and a fifth value is set to be 32, the third value can be determined as 63. Due to 63∈(60,63), therefore, the compensation data T2_4 can be selected from the compensation table 2 for corresponding compensation process.

S980, determining the fifth blue pixel compensation data from the pre-obtained compensation data set as the target compensation data, when the absolute value of the gray scale difference meets the fifth condition.

In the embodiment of the present disclosure, when the absolute value of the gray scale difference of the blue pixel meets the fifth condition, i.e., when the absolute value of the gray scale difference of the blue pixel is greater than the third value but less than or equal to 127, the corresponding fifth blue pixel compensation data is selected from the compensation data set for the corresponding compensation process.

Exemplarily, when the gray scale value of the blue pixel in the target region (region F) is 127 and the gray scale value of the blue pixel in the to-be-calibrated region (region A or B) is 43, the absolute value of the gray scale difference between the blue pixels in the to-be-calibrated region and the target region can be determined as 84. Since the preset threshold is set to be 60, the second standard value is set to be 127, the fourth value is set to be 64, the fifth value is set to be 32, the third value can be determined as 63. Due to 84∈(63,127], therefore, the compensation data T2_4 can be selected from the compensation table 2 for the corresponding compensation process.

Figure 10:
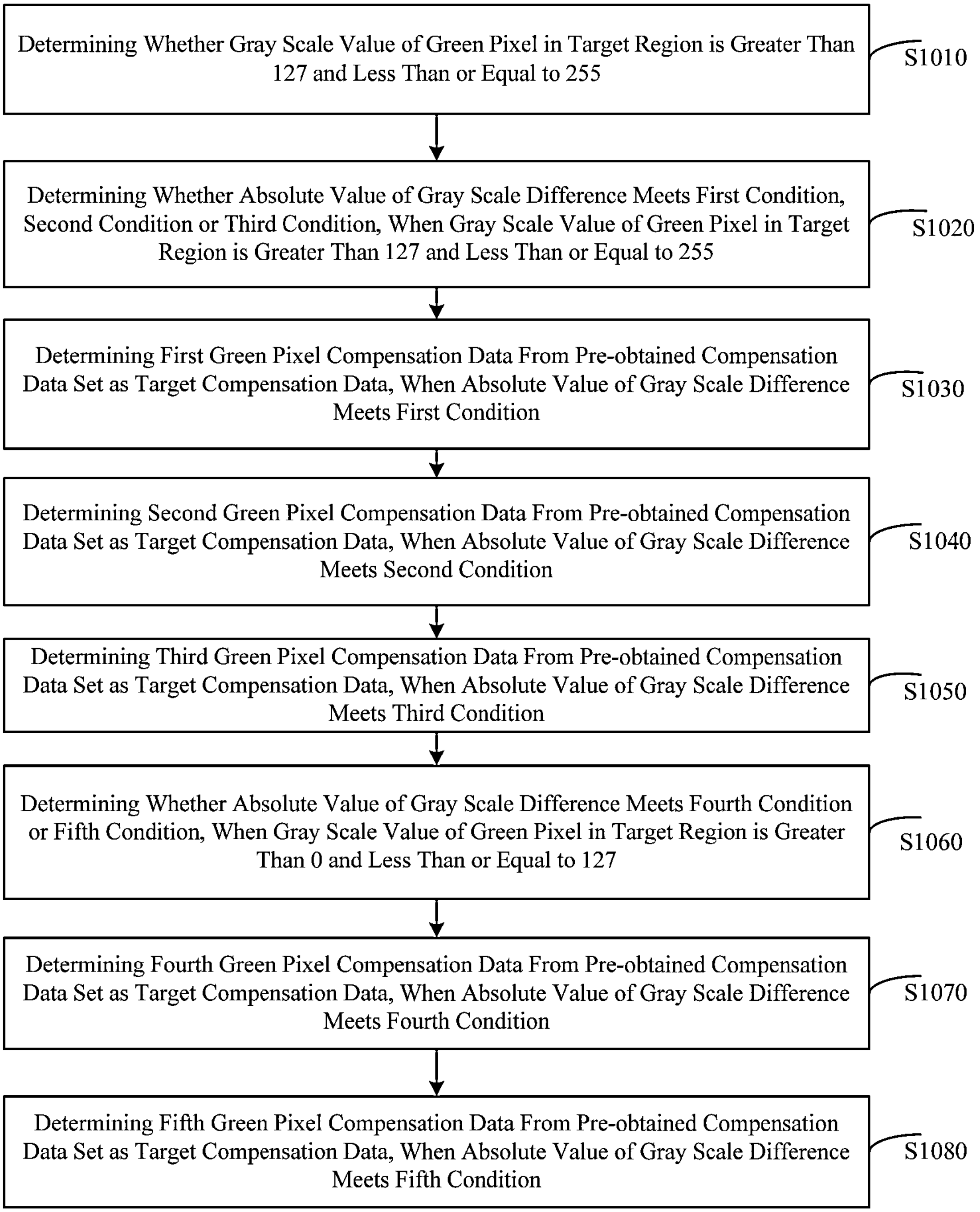
FIG. 10 is a flowchart showing steps that are performed when the target color pixel is the green pixel and the absolute value of the gray scale difference is greater than the preset threshold according to embodiments of the present disclosure.

In one embodiment of the present disclosure ground, referring to FIG. 10, FIG. 10 is a flowchart of steps that are preformed when the target color pixel is a green pixel and the absolute value of the gray scale difference is greater than a preset threshold according to embodiments of the present disclosure, including but not limited to S1010 to S1080.

S1010, determining whether the gray scale value of the green pixel in the target region is greater than 127 and less than or equal to 255.

In an embodiment of the present disclosure, after the target region and the to-be-calibrated region are determined, the absolute value of the gray scale difference between the color pixel in the to-be-calibrated region and the target color pixel in the target region on the same data line may be obtained. At this time, if the target color pixel is the green pixel, the gray scale values of the green pixels in the target region and the to-be-calibrated region may be obtained, so as to obtain the absolute value of the gray scale difference of the green pixel. If the absolute value of the gray scale difference is greater than the preset threshold, it is determined that the effect of the color crosstalk is so large that it is perceptible by the human eye, and therefore it is necessary to select the corresponding compensation data from the preset compensation data set to compensate for the display data of the to-be-calibrated region accordingly. As to which compensation data is to be selected, it is necessary to first determine whether the gray scale value of the green pixel in the target region is greater than 127 and less than or equal to 255, i.e., to determine whether the gray scale value of the green pixel in the target region at this time is a middle-high gray scale value.

S1020, determining whether the absolute value of the gray scale difference meets a first condition, a second condition or a third condition, when the gray scale value of the green pixel in the target region is greater than 127 and less than or equal to 255. The first condition is greater than the preset threshold but less than or equal to the first absolute value, the second condition is greater than the first absolute value but less than or equal to the second absolute value, and the third condition is greater than the second absolute value but less than or equal to 255, and the first absolute value is an absolute value of a difference between the first standard value and the first value, and the second absolute value is an absolute value of a difference between the first standard value and the second value.

In an embodiment of the present disclosure, when the gray scale value of the green pixel in the target region is greater than 127 and less than or equal to 255, it is necessary to further determine whether the absolute value of the gray scale difference meets the first condition, the second condition, or the third condition, so that it can be determined which compensation data should be selected for the corresponding compensation process based on the conditions met by the absolute value of the gray scale difference.

S1030, determining the first green pixel compensation data from the pre-obtained compensation data set as the target compensation data, when the absolute value of the gray scale difference meets the first condition.

In an embodiment of the present disclosure, when the absolute value of the gray scale difference of the green pixel meets the first condition, i.e., when the absolute value of the gray scale difference of the green pixel is greater than the preset threshold but less than or equal to the first absolute value, the corresponding first green pixel compensation data is selected from the compensation data set.

Exemplarily, when the gray scale value of the green pixel in the target region (region F) is 255 and the gray scale value of the green pixel in the to-be-calibrated region (region A or B) is 132, the absolute value of the gray scale difference between the green pixels in the to-be-calibrated region and the target region can be determined as 123. Since the preset threshold is set to be 60, the first standard value is set to be 255, and the first value is set to be 127, a first absolute value can be determined as 128. Due to 123∈(60,128], therefore, the compensation data T3_1 may be selected from the compensation table 3 for corresponding compensation process.

S1040, determining the second green pixel compensation data from the pre-obtained compensation data set as the target compensation data, when the absolute value of the gray scale difference meets the second condition.

In an embodiment of the present disclosure, when the absolute value of the gray scale difference of the green pixel meets the second condition, i.e., when the absolute value of the gray scale difference of the green pixel is greater than the first absolute value but less than or equal to the second absolute value, the corresponding second green pixel compensation data is selected from the compensation data set for the corresponding compensation process.

Exemplarily, when the gray scale value of the green pixel in the target region (region F) is 255 and the gray scale value of the green pixel in the to-be-calibrated region (region A or B) is 74, the absolute value of the gray scale difference between the green pixels in the to-be-calibrated region and the target region can be determined as 181. Since the preset threshold is set to be 60, a first standard value is set to be 255, a first value is set to be 127, and a second value is set to be 64, the first absolute value can be determined as 128 and the second absolute value can be determined as 191. Due to 181∈(128,191], therefore, the compensation data T3_2 can be selected from the compensation table 3 for corresponding compensation process.

S1050, determining the third green pixel compensation data from the pre-obtained compensation data set as the target compensation data, when the absolute value of the gray scale difference meets the third condition.

In the embodiment of the present disclosure, when the absolute value of the gray scale difference of the green pixel meets the third condition, i.e., when the absolute value of the gray scale difference of the green pixel is greater than the second absolute value but less than or equal to 255, the corresponding third green pixel compensation data is selected from the compensation data set for the corresponding compensation process.

Exemplarily, when the gray scale value of the green pixel in the target region (region F) is 255 and the gray scale value of the green pixel in the to-be-calibrated region (region A or B) is 32, the absolute value of the gray scale difference between the green pixels in the to-be-calibrated region and the target region can be determined as 223. Since the preset threshold is set to be 60, a first standard value is set to be 255, a first value is set to be 127 and a second value is set to be 64, the first absolute value can be determined as 128 and the second value can be determined 191. Due to 223∈(191,255], therefore, the compensation data T3_3 can be selected from the compensation table 3 for corresponding compensation process.

S1060, determining whether the absolute value of the gray scale difference meets a fourth condition or a fifth condition, when the gray scale value of the green pixel in the target region is greater than 0 and less than or equal to 127. The fourth condition is greater than the preset threshold but less than or equal to the third value, the fifth condition is greater than the third value but less than or equal to 127, and the third value is an absolute value of a difference between the second standard value and the fourth value.

In embodiments of the present disclosure, when the gray scale value of the green pixel in the target region is greater than 0 and less than or equal to 127, it is necessary to further determine whether the absolute value of the gray scale difference meets the fourth condition or the fifth condition, so that it can be determined which compensation data should be selected for the corresponding compensation process based on the conditions met by the absolute value of the gray scale difference.

S1070, determining the fourth green pixel compensation data from the pre-obtained compensation data set as the target compensation data, when the absolute value of the gray scale difference meets the fourth condition.

In an embodiment of the present disclosure, when the absolute value of the gray scale difference of the green pixel meets the fourth condition, i.e., when the absolute value of the gray scale difference of the green pixel is greater than the preset threshold but less than or equal to the third value, the corresponding fourth green pixel compensation data is selected from the compensation data set for the corresponding compensation process.

Exemplarily, when the gray scale value of the green pixel in the target region (region F) is 127 and the gray scale value of the green pixel in the to-be-calibrated region (region A or B) is 64, the absolute value of the gray scale difference between the green pixels in the to-be-calibrated region and the target region can be determined as 63. Since the preset threshold is set to be 60, the second standard value is set to be 127, the fourth value is set to be 64, the fifth value is set to be 32, the third value can be determined as 63. Due to 63∈(60,63], therefore, the compensation data T3_4 can be selected from the compensation table 3 for corresponding compensation process.

S1080, determining the fifth green pixel compensation data from the pre-obtained compensation data set as the target compensation data, when the absolute value of the gray scale difference meets the fifth condition.

In the embodiment of the present disclosure, when the absolute value of the gray scale difference of the green pixel meets the fifth condition, i.e., when the absolute value of the gray scale difference of the green pixel is greater than the third value but less than or equal to 127, the corresponding fifth green pixel compensation data is selected from the compensation data set for the corresponding compensation process.

Exemplarily, when the gray scale value of the green pixel in the target region (region F) is 127 and the gray scale value of the green pixel in the to-be-calibrated region (region A or B) is 43, the absolute value of the gray scale difference between the green pixels in the to-be-calibrated region and the target region can be determined as 84. Since the preset threshold is set to be 60, the second standard value is set to be 127, the fourth value is set to be 64, the fifth value is set to be 32, the third value can be determined as 63. Due to 84∈(63,127), therefore, the compensation data T3_5 can be selected from the compensation table 3 for the corresponding compensation process.

Figure 11:
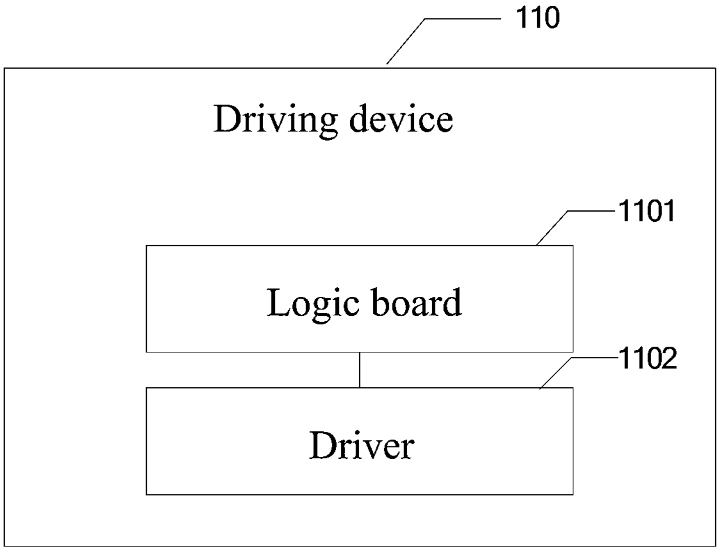
FIG. 11 is a schematic structural diagram of a driving device according to embodiments of the present disclosure.

Referring to FIG. 11, FIG. 11 is a schematic structural diagram of a driving device according to embodiments of the present disclosure. The embodiment of the present disclosure also provides a driving device 110, which includes a logic board 1101 and a driver 1102, the driver 1102 is electrically connected to the logic board 1101.

The logic board 1101 is configured for executing the driving method described in any of the embodiments of the present disclosure.

The driver 1102 is configured for receiving the target compensation data, and compensating for the display data of the to-be-calibrated region based on the target compensation data to drive the to-be-displayed screen to display.

In the driving device of an embodiment of the present disclosure, the logic board 1101 can select preset target compensation data for the corresponding compensation and then drive, when the absolute value of the gray scale difference between the color pixel in the to-be-calibrated region and the target color pixel in the target region on the same data line is greater than a preset threshold, such that the phenomenon of color crosstalk is improved, thereby improving the display image quality.

Embodiments of the present disclosure also provide a display device, which includes a display panel and a driving device 110 shown in FIG. 11. The driver 1102 is configured for compensating for the display data of the to-be-calibrated region based on the target compensation data, so as to drive the to-be-displayed screen to display on the display panel.

Since the display device provided in the embodiments of the present disclosure includes the driving device 110 according to any of the embodiments of the present disclosure, the display device according to the embodiments of the present disclosure has the advantages of the driving device 110 described above, The preset target compensation data for the corresponding compensation is selected and then drive, when the absolute value of the gray scale difference between the color pixel in the to-be-calibrated region and the target color pixel in the target region on the same data line is greater than a preset threshold, which can improve the phenomenon of color crosstalk, thereby improving the display image quality.

Embodiments of the present disclosure also provide an electronic device, the electronic device includes a memory and a processor, the memory stores a computer program, and the processor when executing the computer program implements the above-described driving method of the display panel. The electronic device may be any intelligent terminal including a tablet computer, an in-vehicle computer, and so on.

Figure 12:
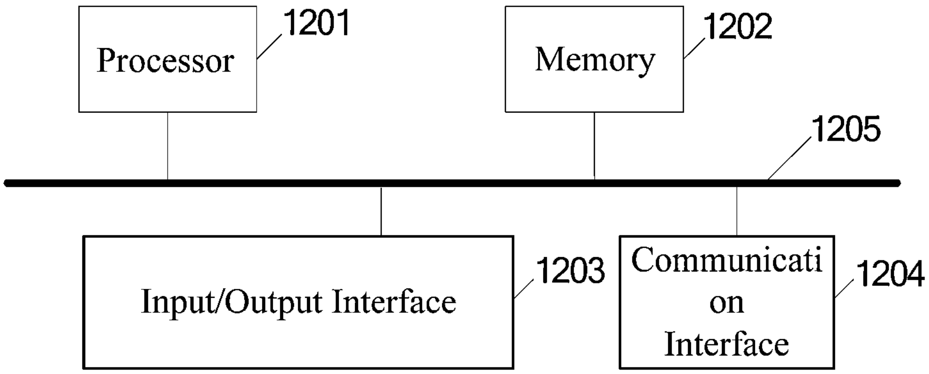
FIG. 12 is a schematic diagram of a hardware structure of the electronic device according to embodiments of the present disclosure.

Referring to FIG. 12, FIG. 12 is a schematic diagram of a hardware structure of an electronic device according to an embodiment of the present disclosure, the electronic device includes:

a processor 1201, which may be implemented by means of a general-purpose central processing unit (CPU), a microprocessor, an Application Specific Integrated Circuit (ASIC), or one or more integrated circuits for executing a relevant program to implement the technical solutions according to the embodiments of the present disclosure;

a memory 1202, which may be implemented in the form of a Read Only Memory (ROM), a static storage device, a dynamic storage device, or a Random Access Memory (RAM). The memory 1202 may store an operating system and other applications, and when the technical solutions provided in the embodiments of the present specification are implemented by software or firmware, the relevant program code is stored in the memory 1202 and called by the processor 1201 to execute the driving method of the display panel of the embodiments of the present disclosure;

an input/output interface 1203 for realizing information input and output;

a communication interface 1204 for realizing communication interaction between the device and other devices, which can be realized by wired means (e.g. USB, network cable, etc.) or by wireless means (e.g. mobile network, WIFI, Bluetooth, etc.);

a bus 1205 for transmitting information among various components of the device (e.g., processor 1201, memory 1202, input/output interface 1203, and communication interface 1204);

the processor 1201, the memory 1202, the input/output interface 1203, and the communication interface 1204 are communicated with each other within the device via the bus 1205.

The embodiments described in the present disclosure are for the purpose of more clearly illustrating the technical solutions of embodiments of the present disclosure, and do not constitute a limitation of the technical solutions provided by embodiments of the present disclosure, and it is understood by those skilled in the art that, with the evolution of the technology and the emergence of new application scenarios, the technical solutions provided by embodiments of the present disclosure are equally applicable to similar technical problems.

It is understood by those skilled in the art that the technical solutions illustrated in the drawings do not constitute a limitation of the embodiments of the present disclosure, and may include more or fewer steps than illustrated, or a combination of certain steps, or different steps.

The above-described embodiments of the device are merely schematic, the units illustrated as separated components may or may not be physically separated, i.e., they may be located in one place, or they may also be distributed over a plurality of network units. Some or all of these modules may be selected to fulfil the purpose of the embodiment scheme according to actual needs.

It will be when understood by those skilled in the art that all or some of the steps, systems, functional modules/units in the apparatus of the method disclosed above may be implemented as software, firmware, hardware and suitable combinations thereof.

The terms "first", "second", "third", "fourth", etc. (if any) in the specification of the present disclosure and the above-described accompanying drawings. The terms "first", "second", "third", "fourth", etc. (if any) in the specification of this application and the accompanying drawings described above are used to distinguish between similar objects and needn't be used to describe a particular order or sequence. It should be when understood that the data so used may be interchangeable, where appropriate, so that the embodiments of the present disclosure described herein can be implemented in an order other than those illustrated or described herein. In addition, the terms "comprising" and "having", and any variations thereof, are intended to cover non-exclusive embodiments, e.g., a process, method, system, product, or apparatus comprising a series of steps or units need not be limited to those steps or units clearly listed, but may instead include other steps or units that are not clearly listed or are inherent to those processes, methods, products or devices.

The above description of the preferred embodiments of the present disclosure with reference to the accompanying drawings is not intended to limit the scope of the embodiments of the present disclosure. Any modifications, equivalent substitutions, and improvements made by those skilled in the art without departing from the scope and substance of the embodiments of the present disclosure shall be within the scope of the embodiments of the present disclosure.

What is claimed is:

1. A driving method, comprising:

detecting a data signal of a to-be-displayed screen to obtain a gray scale value of each region in the to-be-displayed screen;

determining whether there is a target region in the to-be-displayed screen based on the gray scale value of each region, wherein a gray scale value of a target color pixel in the target region is greater than 0, and gray scale values of color pixels in the target region other than the target color pixel are all equal to 0, and the target color pixel is a red pixel, a blue pixel or a green pixel;

determining whether there is a to-be-calibrated region in the to-be-displayed screen, when there is the target region in the to-be-displayed screen, wherein the to-be-calibrated region is a region adjacent to the target region on a data line, and a gray scale value of each color pixel in the to-be-calibrated region is the same;

determining that there is color crosstalk in the to-be-displayed screen, when there is the to-be-calibrated region in the to-be-displayed screen;

obtaining an absolute value of a gray scale difference between each color pixel in the to-be-calibrated region and the target color pixel in the target region on the same data line, when there is the color crosstalk in the to-be-displayed screen;

determining whether the absolute value of the gray scale difference is greater than a preset threshold;

determining target compensation data from a pre-obtained compensation data set based on the absolute value of the gray scale difference, when the absolute value of the gray scale difference is greater than the preset threshold; and sending the target compensation data to a driver for the driver compensating for display data of the to-be-calibrated region based on the target compensation data, to drive the to-be-displayed screen to display.

2. The method according to claim 1, further comprising:

determining that there is no color crosstalk in the to-be-displayed screen, when there is no target region in the to-be-displayed screen, or there is no to-be-calibrated region in the to-be-displayed screen.

3. The method according to claim 1, wherein the obtaining the compensation data set comprises:

formulating a standard crosstalk detection screen, wherein the standard crosstalk detection screen comprises the target region, the to-be-calibrated region and a standard region, the standard region is a region adjacent to the target region in a horizontal direction;

setting a gray scale value of the target color pixel in the target region to be a first standard value, and sequentially setting the gray scale value of each color pixel in the to-be-calibrated region and the standard region to be a first value, a second value and a third value, wherein the first standard value is greater than 127 and less than or equal to 255, the first value is less than the first standard value, and the first value, the second value and the third value decrease in turn;

setting the gray scale value of the target color pixel in the target region to be a second standard value, and sequentially setting the gray scale value of each color pixel in the to-be-calibrated region and the standard region to be a fourth value, a fifth value, wherein the second standard value is greater than 0 and less than or equal to 127, and the fourth value is less than the second standard value, the fourth value and the fifth value decrease in turn;

taking a color coordinate of the standard region as a standard color coordinate, and taking a luminance of the standard region as a standard luminance;

obtaining color coordinates and luminances of the to-be-calibrated region when the gray scale value of each color pixel in the to-be-calibrated region is set to one value of the first value, the second value, the third value, the fourth value, and the fifth value; and obtaining the compensation data set based on the color coordinates and luminances of the to-be-calibrated region, the standard color coordinate and the standard luminance, when the gray scale value of each color pixel in the to-be-calibrated region is set to one value of the first value, the second value, the third value, the fourth value, and the fifth value.

4. The method according to claim 3, wherein the obtaining the compensation data set based on the color coordinates and luminances of the to-be-calibrated region, the standard color coordinate and the standard luminance, when the gray scale value of each color pixel in the to-be-calibrated region is set to one value of the first value, the second value, the third value, the fourth value, and the fifth value, comprises:

when the target color pixel is the red pixel, sequentially compensating for voltages of a red pixel and a green pixel in the to-be-calibrated region until a coordinate error between the color coordinate of the to-be-calibrated region and the standard color coordinate is less than a first preset error, and a luminance error between the luminance of the to-be-calibrated region and the standard luminance is less than a second preset error, to sequentially obtain a first red pixel compensation data when each color pixel in the to-be-calibrated region is at the first value, a second red pixel compensation data when in the second value, and a third red pixel compensation data when each color pixel in the to-be-calibrated region is at the third value, when the gray scale value of the red pixel in the target region is the first standard value; and to sequentially obtain a fourth red pixel compensation data when each color pixel in the to-be-calibrated region is at the fourth value, and a fifth red pixel compensation data when each color pixel in the to-be-calibrated region is at the fifth value, when the gray scale value of the red pixel in the target region is the second standard value;

when the target color pixel is the blue pixel, sequentially compensating for voltages of the blue pixel and the red pixel in the to-be-calibrated region until the coordinate error between the color coordinate of the to-be-calibrated region and the standard color coordinate is less than the first preset error, and the luminance error between the luminance of the to-be-calibrated region and the standard luminance is less than the second preset error, to sequentially obtain a first blue pixel compensation data when each color pixel in the to-be-calibrated region is at the first value, a second blue pixel compensation data when each color pixel in the to-be-calibrated region is at the second value, and a third blue pixel compensation data when in the third value, when the gray scale value of the blue pixel in the target region is the first standard value; and to sequentially obtain a fourth blue pixel compensation data when each color pixel in the to-be-calibrated region is at the fourth value, and a fifth blue pixel compensation data when each color pixel in the to-be-calibrated region is at the fifth value, when the gray scale value of the blue pixel in the target region is the second standard value;

when the target color pixel is the green pixel, sequentially compensating for voltages of the green pixel and the blue pixel in the to-be-calibrated region until the coordinate error between the color coordinate of the to-be-calibrated region and the standard color coordinate is less than the first preset error, and the luminance error between the luminance of the to-be-calibrated region and the standard luminance is less than the second preset error, to sequentially obtain a first green pixel compensation data when each color pixel in the to-be-calibrated region is at the first value, a second green pixel compensation data when in the second value, and a third green pixel compensation data when each color pixel in the to-be-calibrated region is at the third value, when the gray scale value of the green pixel in the target region is the first standard value; and to sequentially obtain a fourth green pixel compensation data when each color pixel in the to-be-calibrated region is at the fourth value, and a fifth green pixel compensation data when each color pixel in the to-be-calibrated region is at the fifth value, when the gray scale value of the green pixel in the target region is the second standard value; and gathering the obtained first red pixel compensation data, the second red pixel compensation data, the third red pixel compensation data, the fourth red pixel compensation data, the fifth red pixel compensation data, the first blue pixel compensation data, the second blue pixel compensation data, the third blue pixel compensation data, the fourth blue pixel compensation data, the fifth blue pixel compensation data, the first green pixel compensation data, the second green pixel compensation data, the third green pixel compensation data, the fourth green pixel compensation data and the fifth green pixel compensation data to the compensation data set.

5. The method according to claim 4, wherein when the target color pixel is the red pixel and the absolute value of the gray scale difference is greater than the preset threshold, the method comprises:

determining whether the gray scale value of the red pixel in the target region is greater than 127 and less than or equal to 255;

determining whether the absolute value of the gray scale difference meets a first condition, a second condition or a third condition, when the gray scale value of the red pixel in the target region is greater than 127 and less than or equal to 255, wherein the first condition is that the absolute value of the gray scale difference is greater than the preset threshold but less than or equal to the first absolute value, the second condition is that the absolute value of the gray scale difference is greater than the first absolute value but less than or equal to the second absolute value, and the third condition is that the absolute value of the gray scale difference is greater than the second absolute value but less than or equal to 255, and the first absolute value is an absolute value of a difference between the first standard value and the first value, and the second absolute value is an absolute value of a difference between the first standard value and the second value;

determining the first red pixel compensation data from the pre-obtained compensation data set as the target compensation data, when the absolute value of the gray scale difference meets the first condition;

determining the second red pixel compensation data from the pre-obtained compensation data set as the target compensation data, when the absolute value of the gray scale difference meets the second condition;

determining the third red pixel compensation data from the pre-obtained compensation data set as the target compensation data, when the absolute value of the gray scale difference meets the third condition;

determining whether the absolute value of the gray scale difference meets a fourth condition or a fifth condition, when the gray scale value of the red pixel in the target region is greater than 0 and less than or equal to 127, wherein the fourth condition is that the absolute value of the gray scale difference is greater than the preset threshold but less than or equal to the third value, the fifth condition is that the absolute value of the gray scale difference is greater than the third value but less than or equal to 127, and the third value is an absolute value of a difference between the second standard value and the fourth value;

determining the fourth red pixel compensation data from the pre-obtained compensation data set as the target compensation data, when the absolute value of the gray scale difference meets the fourth condition; and determining the fifth red pixel compensation data from the pre-obtained compensation data set as the target compensation data, when the absolute value of the gray scale difference meets the fifth condition.

6. The method according to claim 4, wherein when the target color pixel is the blue pixel and the absolute value of the gray scale difference is greater than the preset threshold, the method comprises:

determining whether the gray scale value of the blue pixel in the target region is greater than 127 and less than or equal to 255;

determining whether the absolute value of the gray scale difference meets a first condition, a second condition or a third condition, when the gray scale value of the blue pixel in the target region is greater than 127 and less than or equal to 255, wherein the first condition is that the absolute value of the gray scale difference is greater than the preset threshold but less than or equal to the first absolute value, the second condition is that the absolute value of the gray scale difference is greater than the first absolute value but less than or equal to the second absolute value, and the third condition is that the absolute value of the gray scale difference is greater than the second absolute value but less than or equal to 255, and the first absolute value is an absolute value of a difference between the first standard value and the first value, and the second absolute value is an absolute value of a difference between the first standard value and the second value;

determining the first blue pixel compensation data from the pre-obtained compensation data set as the target compensation data, when the absolute value of the gray scale difference meets the first condition;

determining the second blue pixel compensation data from the pre-obtained compensation data set as the target compensation data, when the absolute value of the gray scale difference meets the second condition;

determining the third blue pixel compensation data from the pre-obtained compensation data set as the target compensation data, when the absolute value of the gray scale difference meets the third condition;

determining whether the absolute value of the gray scale difference meets a fourth condition or a fifth condition, when the gray scale value of the blue pixel in the target region is greater than 0 and less than or equal to 127, wherein the fourth condition is that the absolute value of the gray scale difference is greater than the preset threshold but less than or equal to the third value, the fifth condition is that the absolute value of the gray scale difference is greater than the third value but less than or equal to 127, and the third value is an absolute value of a difference between the second standard value and the fourth value;

determining the fourth blue pixel compensation data from the pre-obtained compensation data set as the target compensation data, when the absolute value of the gray scale difference meets the fourth condition; and determining the fifth blue pixel compensation data from the pre-obtained compensation data set as the target compensation data, when the absolute value of the gray scale difference meets the fifth condition.

7. The method according to claim 4, wherein when the target color pixel is the green pixel and the absolute value of the gray scale difference is greater than the preset threshold, the method comprises:

determining whether the gray scale value of the green pixel in the target region is greater than 127 and less than or equal to 255;

determining whether the absolute value of the gray scale difference meets a first condition, a second condition or a third condition, when the gray scale value of the green pixel in the target region is greater than 127 and less than or equal to 255, wherein the first condition is that the absolute value of the gray scale difference is greater than the preset threshold but less than or equal to the first absolute value, the second condition is that the absolute value of the gray scale difference is greater than the first absolute value but less than or equal to the second absolute value, and the third condition is that the absolute value of the gray scale difference is greater than the second absolute value but less than or equal to 255, and the first absolute value is an absolute value of a difference between the first standard value and the first value, and the second absolute value is an absolute value of a difference between the first standard value and the second value;

determining the first green pixel compensation data from the pre-obtained compensation data set as the target compensation data, when the absolute value of the gray scale difference meets the first condition;

determining the second green pixel compensation data from the pre-obtained compensation data set as the target compensation data, when the absolute value of the gray scale difference meets the second condition;

determining the third green pixel compensation data from the pre-obtained compensation data set as the target compensation data, when the absolute value of the gray scale difference meets the third condition;

determining whether the absolute value of the gray scale difference meets a fourth condition or a fifth condition, when the gray scale value of the green pixel in the target region is greater than 0 and less than or equal to 127, wherein the fourth condition is that the absolute value of the gray scale difference is greater than the preset threshold but less than or equal to the third value, the fifth condition is that the absolute value of the gray scale difference is greater than the third value but less than or equal to 127, and the third value is an absolute value of a difference between the second standard value and the fourth value;

determining the fourth green pixel compensation data from the pre-obtained compensation data set as the target compensation data, when the absolute value of the gray scale difference meets the fourth condition; and determining the fifth green pixel compensation data from the pre-obtained compensation data set as the target compensation data, when the absolute value of the gray scale difference meets the fifth condition.

8. The method according to claim 3, wherein when the gray scale value of the target color pixel in the target region is the second standard value, the gray scale value of the target color pixel in the target region belongs to a middle-low gray scale.

9. The method according to claim 8, wherein when the gray scale value of the target color pixel in the target region is the first standard value, the gray scale value of the target color pixel in the target region belongs to a middle-high gray scale.

10. The method according to claim 1, wherein the detecting the data signal of the to-be-displayed screen to obtain the gray scale value of each region in the to-be-displayed screen, comprises:

receiving, by a logic board, the data signal of the to-be-displayed screen, and detecting the data signal, by the logic board, to obtain the gray scale value of each region of the to-be-displayed screen, comprising the gray scale values of the red pixel, the blue pixel and the green pixel in each region.

11. The method according to claim 1, wherein after the target region is determined, an upper region adjacent to the target region on the data line and a lower region adjacent to the target region on the data line is determined as the to-be-calibrated region.

12. The method according to claim 11, wherein when an upper edge of the target region just overlaps with an outermost upper edge of the to-be-displayed screen, there is no upper region in the to-be-calibrated region adjacent to the target region on the data line, there is only a lower region adjacent to the target region on the data line; and when a lower edge of the target region just overlaps the outermost lower edge of the to-be-displayed screen, there is no lower region in the to-be-calibrated region adjacent to the target region on the data line, there is only the upper region adjacent to the target region on the data line.

13. The method according to claim 1, wherein after the target compensation data is obtained, a logic board is configured to output a high level, and the logic board is configured to output the target compensation data to the driver, for the driver compensating for the display data of the to-be-calibrated region based on the target compensation data, to drive the to-be-displayed screen to display.

14. The method according to claim 13, wherein when the absolute value of the gray scale difference between the to-be-calibrated region and the target region on the same data line is not greater than the preset threshold, the logic board is configured to output no target compensation data.

15. A driving device, comprising a logic board and a driver, wherein the driver is electrically connected to the logic board;

wherein the logic board is configured for executing a driving method;

wherein the method comprises:

detecting a data signal of a to-be-displayed screen to obtain a gray scale value of each region in the to-be-displayed screen;

determining whether there is a target region in the to-be-displayed screen based on the gray scale value of each region, wherein a gray scale value of a target color pixel in the target region is greater than 0, and gray scale values of color pixels in the target region other than the target color pixel are all equal to 0, and the target color pixel is a red pixel, a blue pixel or a green pixel;

determining whether there is a to-be-calibrated region in the to-be-displayed screen, when there is the target region in the to-be-displayed screen, wherein the to-be-calibrated region is a region adjacent to the target region on a data line, and a gray scale value of each color pixel in the to-be-calibrated region is the same;

determining that there is color crosstalk in the to-be-displayed screen, when there is the to-be-calibrated region in the to-be-displayed screen;

obtaining an absolute value of a gray scale difference between each color pixel in the to-be-calibrated region and the target color pixel in the target region on the same data line, when there is the color crosstalk in the to-be-displayed screen;

determining whether the absolute value of the gray scale difference is greater than a preset threshold;

determining target compensation data from a pre-obtained compensation data set based on the absolute value of the gray scale difference, when the absolute value of the gray scale difference is greater than the preset threshold; and sending the target compensation data to a driver for the driver compensating for display data of the to-be-calibrated region based on the target compensation data, to drive the to-be-displayed screen to display; and wherein the driver is configured for receiving the target compensation data, and compensating for the display data of the to-be-calibrated region based on the target compensation data, to drive the to-be-displayed screen to display.

16. The driving device according to claim 15, further comprising:

determining that there is no color crosstalk in the to-be-displayed screen, when there is no target region in the to-be-displayed screen, or there is no to-be-calibrated region in the to-be-displayed screen.

17. The driving device according to claim 15, wherein the obtaining the compensation data set comprises:

formulating a standard crosstalk detection screen, wherein the standard crosstalk detection screen comprises the target region, the to-be-calibrated region and a standard region, the standard region is a region adjacent to the target region in a horizontal direction;

setting a gray scale value of the target color pixel in the target region to be a first standard value, and sequentially setting the gray scale value of each color pixel in the to-be-calibrated region and the standard region to be a first value, a second value and a third value, wherein the first standard value is greater than 127 and less than or equal to 255, the first value is less than the first standard value, and the first value, the second value and the third value decrease in turn;

setting the gray scale value of the target color pixel in the target region to be a second standard value, and sequentially setting the gray scale value of each color pixel in the to-be-calibrated region and the standard region to be a fourth value, a fifth value, wherein the second standard value is greater than 0 and less than or equal to 127, and the fourth value is less than the second standard value, the fourth value and the fifth value decrease in turn;

taking a color coordinate of the standard region as a standard color coordinate, and taking a luminance of the standard region as a standard luminance;

obtaining color coordinates and luminances of the to-be-calibrated region when the gray scale value of each color pixel in the to-be-calibrated region is set to one value of the first value, the second value, the third value, the fourth value, and the fifth value; and obtaining the compensation data set based on the color coordinates and luminances of the to-be-calibrated region, the standard color coordinate and the standard luminance, when the gray scale value of each color pixel in the to-be-calibrated region is set to one value of the first value, the second value, the third value, the fourth value, and the fifth value.

18. The driving device according to claim 17, wherein the obtaining the compensation data set based on the color coordinates and luminances of the to-be-calibrated region, the standard color coordinate and the standard luminance, when the gray scale value of each color pixel in the to-be-calibrated region is set to one value of the first value, the second value, the third value, the fourth value, and the fifth value, comprises:

when the target color pixel is the red pixel, sequentially compensating for voltages of the red pixel and the green pixel in the to-be-calibrated region until a coordinate error between the color coordinate of the to-be-calibrated region and the standard color coordinate is less than a first preset error, and a luminance error between the luminance of the to-be-calibrated region and the standard luminance is less than a second preset error, to sequentially obtain a first red pixel compensation data when each color pixel in the to-be-calibrated region is at the first value, a second red pixel compensation data when in the second value, and a third red pixel compensation data when each color pixel in the to-be-calibrated region is at the third value, when the gray scale value of the red pixel in the target region is the first standard value; and to sequentially obtain a fourth red pixel compensation data when each color pixel in the to-be-calibrated region is at the fourth value, and a fifth red pixel compensation data when each color pixel in the to-be-calibrated region is at the fifth value, when the gray scale value of the red pixel in the target region is the second standard value;

when the target color pixel is the blue pixel, sequentially compensating for voltages of the blue pixel and the red pixel in the to-be-calibrated region until the coordinate error between the color coordinate of the to-be-calibrated region and the standard color coordinate is less than the first preset error, and the luminance error between the luminance of the to-be-calibrated region and the standard luminance is less than the second preset error, to sequentially obtain a first blue pixel compensation data when each color pixel in the to-be-calibrated region is at the first value, a second blue pixel compensation data when in the second value, and a third blue pixel compensation data when each color pixel in the to-be-calibrated region is at the third value, when the gray scale value of the blue pixel in the target region is the first standard value; and to sequentially obtain a fourth blue pixel compensation data when each color pixel in the to-be-calibrated region is at the fourth value, and a fifth blue pixel compensation data when each color pixel in the to-be-calibrated region is at the fifth value, when the gray scale value of the blue pixel in the target region is the second standard value;

when the target color pixel is the green pixel, sequentially compensating for voltages of the green pixel and the blue pixel in the to-be-calibrated region until the coordinate error between the color coordinate of the to-be-calibrated region and the standard color coordinate is less than the first preset error, and the luminance error between the luminance of the to-be-calibrated region and the standard luminance is less than the second preset error, to sequentially obtain a first green pixel compensation data when each color pixel in the to-be-calibrated region is at the first value, a second green pixel compensation data when each color pixel in the to-be-calibrated region is at the second value, and a third green pixel compensation data when each color pixel in the to-be-calibrated region is at the third value, when the gray scale value of the green pixel in the target region is the first standard value; and to sequentially obtain a fourth green pixel compensation data when each color pixel in the to-be-calibrated region is at the fourth value, and a fifth green pixel compensation data when in the fifth value, when the gray scale value of the green pixel in the target region is the second standard value; and gathering the obtained first red pixel compensation data, the second red pixel compensation data, the third red pixel compensation data, the fourth red pixel compensation data, the fifth red pixel compensation data, the first blue pixel compensation data, the second blue pixel compensation data, the third blue pixel compensation data, the fourth blue pixel compensation data, the fifth blue pixel compensation data, the first green pixel compensation data, the second green pixel compensation data, the third green pixel compensation data, the fourth green pixel compensation data and the fifth green pixel compensation data to the compensation data set.

19. The driving device according to claim 18, wherein when the target color pixel is the red pixel and the absolute value of the gray scale difference is greater than the preset threshold, the method comprises:

determining whether the gray scale value of the red pixel in the target region is greater than 127 and less than or equal to 255;

determining whether the absolute value of the gray scale difference meets a first condition, a second condition or a third condition, when the gray scale value of the red pixel in the target region is greater than 127 and less than or equal to 255, wherein the first condition is that the absolute value of the gray scale difference is greater than the preset threshold but less than or equal to the first absolute value, the second condition is that the absolute value of the gray scale difference is greater than the first absolute value but less than or equal to the second absolute value, and the third condition is that the absolute value of the gray scale difference is greater than the second absolute value but less than or equal to 255, and the first absolute value is an absolute value of a difference between the first standard value and the first value, and the second absolute value is an absolute value of a difference between the first standard value and the second value;

determining the first red pixel compensation data from the pre-obtained compensation data set as the target compensation data, when the absolute value of the gray scale difference meets the first condition;

determining the second red pixel compensation data from the pre-obtained compensation data set as the target compensation data, when the absolute value of the gray scale difference meets the second condition;

determining the third red pixel compensation data from the pre-obtained compensation data set as the target compensation data, when the absolute value of the gray scale difference meets the third condition;

determining whether the absolute value of the gray scale difference meets a fourth condition or a fifth condition, when the gray scale value of the red pixel in the target region is greater than 0 and less than or equal to 127, wherein the fourth condition is that the absolute value of the gray scale difference is greater than the preset threshold but less than or equal to the third value, the fifth condition is that the absolute value of the gray scale difference is greater than the third value but less than or equal to 127, and the third value is an absolute value of a difference between the second standard value and the fourth value;

determining the fourth red pixel compensation data from the pre-obtained compensation data set as the target compensation data, when the absolute value of the gray scale difference meets the fourth condition; and determining the fifth red pixel compensation data from the pre-obtained compensation data set as the target compensation data, when the absolute value of the gray scale difference meets the fifth condition.

20. A display device, comprising a display panel and a driving device;

wherein the driving device comprises a logic board and a driver, wherein the driver is electrically connected to the logic board;

wherein the logic board is configured for executing a driving method; and wherein the driver is configured for receiving target compensation data, and compensating for display data of a to-be-calibrated region based on the target compensation data, to drive a to-be-displayed screen to display;

wherein the method comprises:

detecting a data signal of the to-be-displayed screen to obtain a gray scale value of each region in the to-be-displayed screen;

determining whether there is a target region in the to-be-displayed screen based on the gray scale value of each region, wherein a gray scale value of a target color pixel in the target region is greater than 0, and gray scale values of color pixels in the target region other than the target color pixel are all equal to 0, and the target color pixel is a red pixel, a blue pixel or a green pixel;

determining whether there is a to-be-calibrated region in the to-be-displayed screen, when there is the target region in the to-be-displayed screen, wherein the to-be-calibrated region is a region adjacent to the target region on a data line, and a gray scale value of each color pixel in the to-be-calibrated region is the same;

determining that there is color crosstalk in the to-be-displayed screen, when there is the to-be-calibrated region in the to-be-displayed screen;

obtaining an absolute value of a gray scale difference between each color pixel in the to-be-calibrated region and the target color pixel in the target region on the same data line, when there is the color crosstalk in the to-be-displayed screen;

determining whether the absolute value of the gray scale difference is greater than a preset threshold;

determining the target compensation data from a pre-obtained compensation data set based on the absolute value of the gray scale difference, when the absolute value of the gray scale difference is greater than the preset threshold; and sending the target compensation data to a driver for the driver compensating for display data of the to-be-calibrated region based on the target compensation data, to drive the to-be-displayed screen to display;

wherein the driver is configured for compensating for the display data of the to-be-calibrated region based on the target compensation data, to drive the to-be-displayed screen to display on the display panel.

* * * * *